(12) United States Patent
Nishio et al.

(10) Patent No.: US 10,247,928 B2
(45) Date of Patent: Apr. 2, 2019

(54) ZOOM LENS AND IMAGE PICKUP APPARATUS INCLUDING THE SAME

(71) Applicant: OLYMPUS CORPORATION, Hachioji-shi, Tokyo (JP)

(72) Inventors: Akinori Nishio, Hachioji (JP); Koji Nakagawa, Yokohama (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/840,671

(22) Filed: Dec. 13, 2017

(65) Prior Publication Data

US 2018/0100995 A1 Apr. 12, 2018

Related U.S. Application Data

(63) Continuation of application No. PCT/JP2016/061133, filed on Apr. 5, 2016.

(30) Foreign Application Priority Data

Jun. 17, 2015 (JP) ................................ 2015-121920

(51) Int. Cl.
*G02B 15/14* (2006.01)
*G02B 15/177* (2006.01)
(Continued)

(52) U.S. Cl.
CPC ......... *G02B 15/177* (2013.01); *G02B 13/009* (2013.01); *G02B 13/0045* (2013.01);
(Continued)

(58) Field of Classification Search
CPC ........ G02B 15/00; G02B 15/14; G02B 15/15; G02B 15/16; G02B 15/163; G02B 15/177; G02B 15/20; G02B 15/22
See application file for complete search history.

(56) References Cited

U.S. PATENT DOCUMENTS

2005/0073751 A1 4/2005 Mihara
2010/0165480 A1* 7/2010 Yamaguchi .......... G02B 15/177
359/686

(Continued)

FOREIGN PATENT DOCUMENTS

JP 2004151552 A 5/2004
JP 2012198506 A 10/2012

(Continued)

OTHER PUBLICATIONS

International Search Report (ISR) and Written Opinion dated Jun. 21, 2016 issued in International Application No. PCT/JP2016/061133.

(Continued)

*Primary Examiner* — Thong Q Nguyen
(74) *Attorney, Agent, or Firm* — Holtz, Holtz & Volek PC

(57) ABSTRACT

A zoom lens includes, in order from the object side, a first lens unit having negative refractive power, a second lens unit having positive refractive power, a third lens unit having negative refractive power, and a fourth lens unit having positive refractive power. At a time of zooming from a wide-angle end to a telephoto end, the distance between the first lens unit and the second lens unit is reduced, the distance between the third lens unit and the fourth lens unit is increased, and the fourth lens unit is fixed.

11 Claims, 14 Drawing Sheets

(51) Int. Cl.
*G02B 13/18* (2006.01)
*G02B 15/20* (2006.01)
*G02B 13/00* (2006.01)
*H04N 5/232* (2006.01)

(52) U.S. Cl.
CPC ............ *G02B 13/18* (2013.01); *G02B 15/20* (2013.01); *H04N 5/23296* (2013.01)

(56) References Cited

U.S. PATENT DOCUMENTS

| | | | |
|---|---|---|---|
| 2012/0229903 A1 | 9/2012 | Matsumura | |
| 2012/0257285 A1 | 10/2012 | Kuzuhara et al. | |
| 2013/0215320 A1* | 8/2013 | Souma | G02B 15/177 348/349 |
| 2015/0309328 A1* | 10/2015 | Takakubo | G02B 15/177 359/557 |

FOREIGN PATENT DOCUMENTS

| | | |
|---|---|---|
| JP | 2012226307 A | 11/2012 |
| JP | 2013218229 A | 10/2013 |
| JP | 2013242501 A | 12/2013 |

OTHER PUBLICATIONS

International Preliminary Report on Patentability (IPRP) dated Dec. 28, 2017 issued in counterpart International Application No. PCT/JP2016/061133.

* cited by examiner

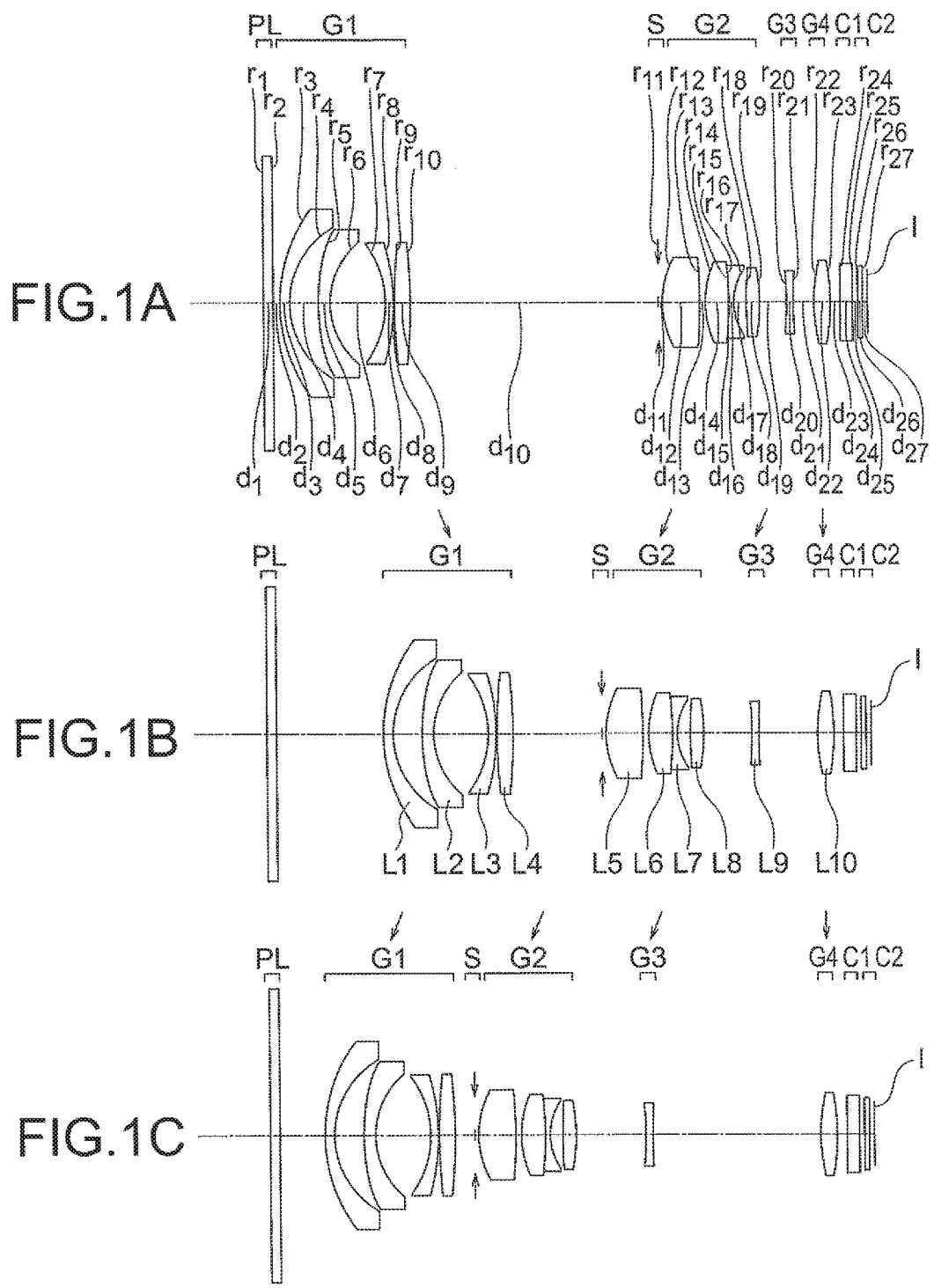

FIG.6A
SA
FNO = 1.849
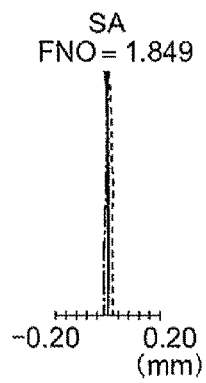
-0.20   0.20
(mm)
FIG.6B
AS
ω = 46.42
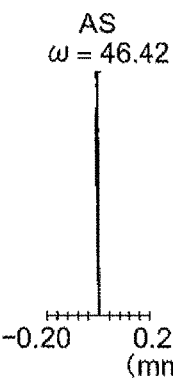
-0.20   0.20
(mm)
FIG.6C
DT
ω = 46.42
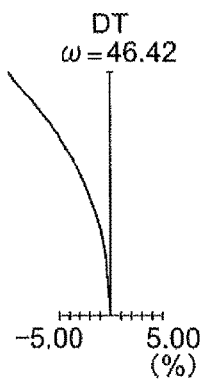
-5.00   5.00
(%)
FIG.6D
CC
ω = 46.42
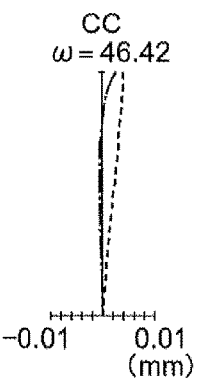
-0.01   0.01
(mm)
FIG.6E
SA
FNO = 2.611
d LINE
g LINE
FIG.6F
AS
ω = 22.99
ΔS   ΔM
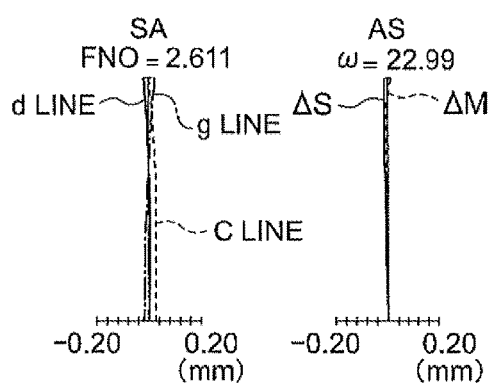
C LINE
-0.20   0.20
(mm)
-0.20   0.20
(mm)
FIG.6G
DT
ω = 22.99
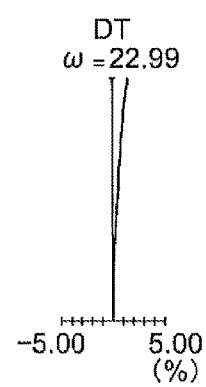
-5.00   5.00
(%)
FIG.6H
CC
ω = 22.99
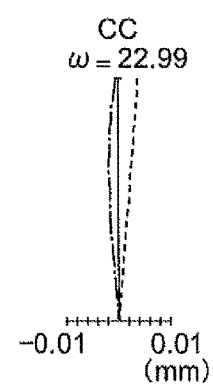
-0.01   0.01
(mm)
FIG.6I
SA
FNO = 4.440
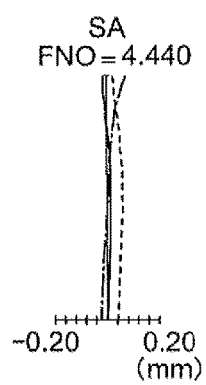
-0.20   0.20
(mm)
FIG.6J
AS
ω = 10.47
-0.20   0.20
(mm)
FIG.6K
DT
ω = 10.47
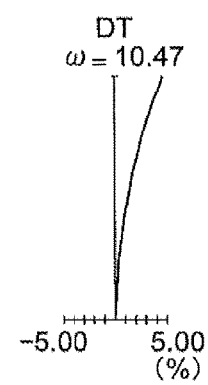
-5.00   5.00
(%)
FIG.6L
CC
ω = 10.47
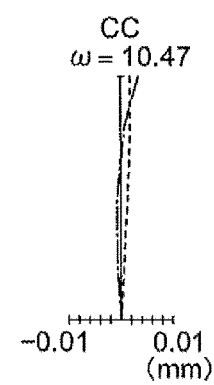
-0.01   0.01
(mm)
435.84 —·—·—
656.27 --------
587.56 ————

SA
FNO = 1.865

-0.20  0.20
(mm)

AS
ω = 46.34

-0.20  0.20
(mm)

DT
ω = 46.34

-5.00  5.00
(%)

CC
ω = 46.34

-0.01  0.01
(mm)

SA
FNO = 2.807

-0.20  0.20
(mm)

AS
ω = 21.22

-0.20  0.20
(mm)

DT
ω = 21.22

-5.00  5.00
(%)

CC
ω = 21.22

-0.01  0.01
(mm)

SA
FNO = 4.269

-0.20  0.20
(mm)

AS
ω = 8.86

-0.20  0.20
(mm)

DT
ω = 8.86

-5.00  5.00
(%)

CC
ω = 8.86

-0.01  0.01
(mm)

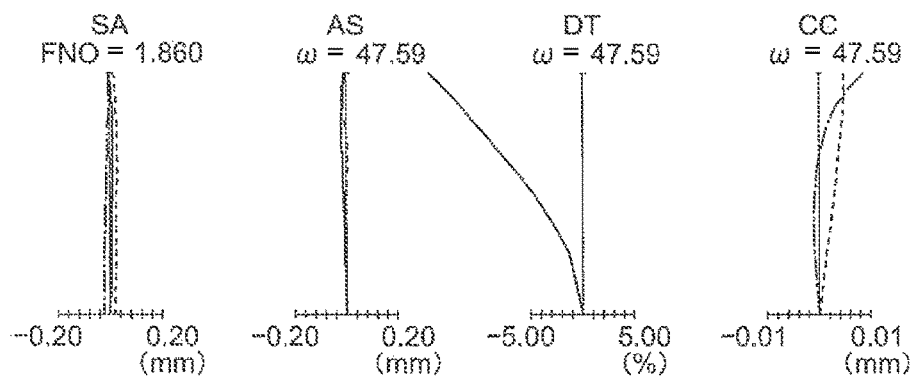
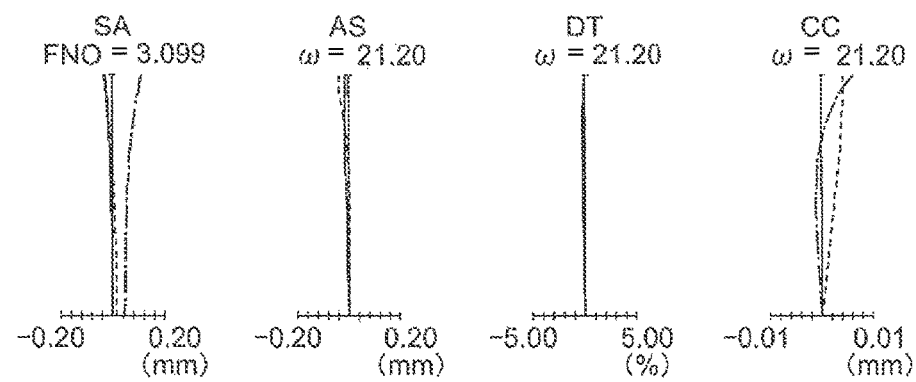
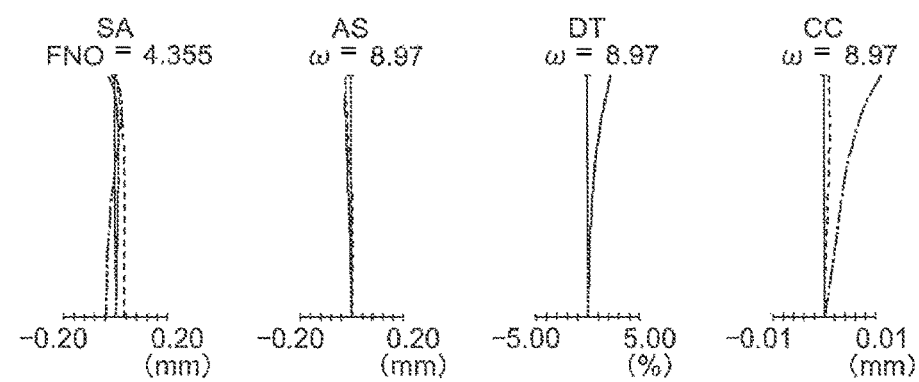

SA
FNO = 1.827

AS
ω = 47.35

DT
ω = 47.35

CC
ω = 47.35

SA
FNO = 3.018

AS
ω = 21.51

DT
ω = 21.51

CC
ω = 21.51

SA
FNO = 4.293

AS
ω = 9.13

DT
ω = 9.13

CC
ω = 9.13

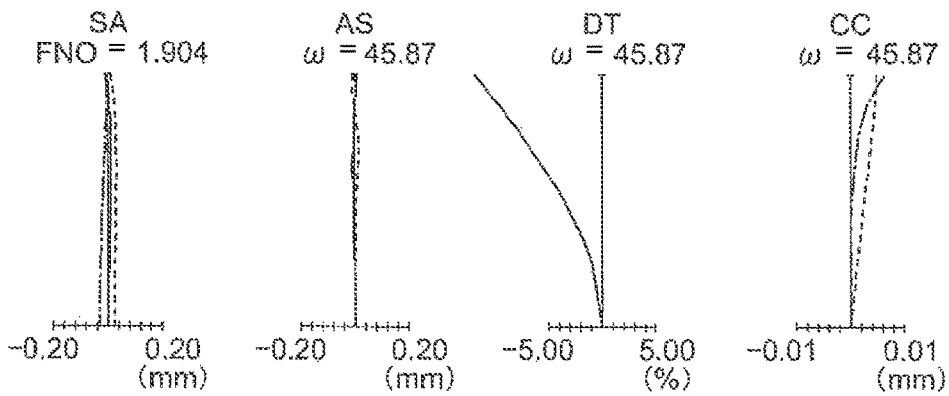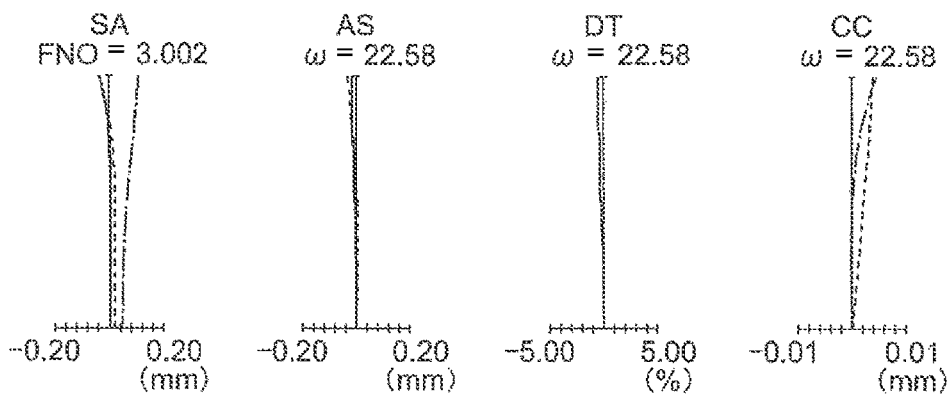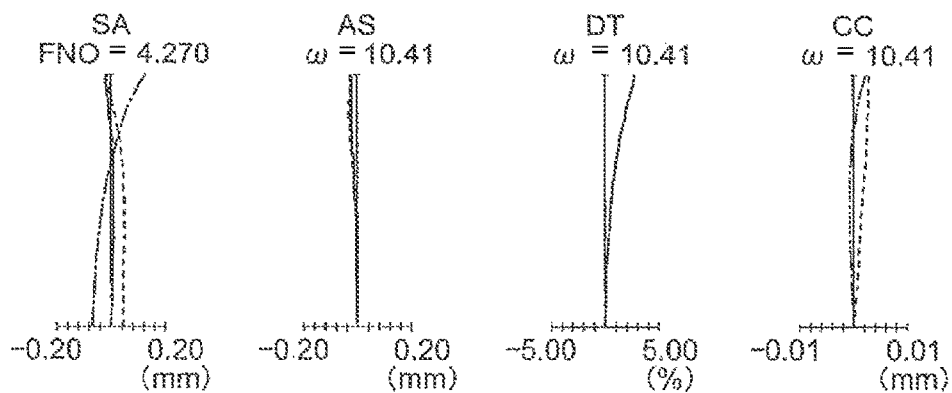

ZOOM LENS AND IMAGE PICKUP APPARATUS INCLUDING THE SAME

CROSS-REFERENCE TO RELATED APPLICATION

The present application is a continuation application of International Application No. PCT/JP2016/061133 filed on Apr. 5, 2016 which is based upon and claims the benefit of priority from Japanese Patent Application No. 2015-121920 filed on Jun. 17, 2015; the entire contents of which are incorporated herein by reference.

BACKGROUND OF THE INVENTION

Field of the Invention

The present invention relates to a zoom lens and an image pickup apparatus including the same.

Description of the Related Art

In recent years, digital cameras such as digital video cameras and digital still cameras have rapidly become widespread. Solid-state image pickup elements, for example, charge coupled devices (CCDs) or complementary metal-oxide semiconductors (CMOSs) are used in digital cameras.

In digital cameras including solid-state image pickup elements, it is possible to reduce the size of the camera body. Furthermore, it is possible to enhance the image quality of images by increasing the number of pixels of the solid-state image pickup element, that is, by having the increased number of pixels. Based on this, there is growing demand for zoom lenses excellent in portability and adapted to the increased number of pixels. In addition, zoom lenses are requested to have a wide angle of view.

In the background of such requests, in particular, cameras that are compact yet equipped with wide-angle and large-aperture zoom lenses have been increasing. As such a zoom lens, a four-unit zoom lens including, in order from the object side, a lens unit having negative refractive power, a lens unit having positive refractive power, a lens unit having negative refractive power, and a lens unit having positive refractive power has conventionally been developed. As the conventional zoom lenses, zoom lenses disclosed in Japanese Patent Application Laid-open No. 2013-242501, Japanese Patent Application Laid-open No. 2012-198506, and Japanese Patent Application Laid-open No. 2012-226307 are available.

Japanese Patent Application Laid-open No. 2013-242501 discloses a four-unit zoom lens. This zoom lens includes, in order from the object side, a first lens unit having negative refractive power, a second lens unit having positive refractive power, a third lens unit having negative refractive power, and a fourth lens unit having positive refractive power.

Furthermore, in this zoom lens, the zoom ratio is about 3.5 times, the half angle of view at the wide-angle end is about 34 degrees, and the F-number of the wide-angle end is about 2.1. Moreover, in this zoom lens, the size reduction of the optical system is achieved.

Furthermore, Japanese Patent Application Laid-open No. 2012-198506 and Japanese Patent Application Laid-open No. 2012-226307 disclose four-unit zoom lenses. These zoom lenses each include, in order from the object side, a first lens unit having negative refractive power, a second lens unit having positive refractive power, a third lens unit having negative refractive power, and a fourth lens unit having positive refractive power. Furthermore, in these zoom lenses, the zoom ratio is about five times, the half angle of view at the wide-angle end is approximately from 50 degrees to 90 degrees, and the F-number of the wide-angle end is about 2.8. In addition, in these zoom lenses, the size reduction of the optical system is achieved.

SUMMARY OF THE INVENTION

A zoom lens according to the present invention comprises:
in order from the object side,
a first lens unit having negative refractive power;
a second lens unit having positive refractive power;
a third lens unit having negative refractive power; and
a fourth lens unit having positive refractive power,
wherein
at a time of zooming from a wide-angle end to a telephoto end, the distance between the first lens unit and the second lens unit is reduced,
the distance between the third lens unit and the fourth lens unit is increased,
the fourth lens unit is fixed, and
Conditional Expressions (1) and (2) below are satisfied:

$$2.5 \leq f_2/f_w \leq 4.5 \qquad (1)$$

$$4.3 \leq \Delta_{2GWT}/f_w \leq 8.0 \qquad (2)$$

where
$f_2$ is a focal length of the second lens unit,
$f_w$ is a focal length of the entire zoom lens at the wide-angle end, and
$\Delta_{2GWT}$ is a total amount of movement of the second lens unit at the time of zooming from the wide-angle end to the telephoto end.

Furthermore, another zoom lens according to the present invention comprises:
in order from the object side,
a first lens unit having negative refractive power;
a second lens unit having positive refractive power;
a third lens unit having negative refractive power; and
a fourth lens unit having positive refractive power,
wherein
at a time of zooming from a wide-angle end to a telephoto end,
the first lens unit is fixed,
the distance between the first lens unit and the second lens unit is reduced,
the distance between the second lens unit and the third lens unit is increased,
the fourth lens unit moves to the image side, and
Conditional Expressions (1a) and (2a) below are satisfied:

$$f_2/f_w \leq 5.0 \qquad (1a)$$

$$4.3 \leq \Delta_{2GWT}/f_w \qquad (2a)$$

where
$f_2$ is a focal length of the second lens unit,
$f_w$ is a focal length of the entire zoom lens at the wide-angle end, and
$\Delta_{2GWT}$ is a total amount of movement of the second lens unit at the time of zooming from the wide-angle end to the telephoto end.

Furthermore, an image pickup apparatus according to the present invention comprises:

the zoom lens described above; and an image pickup element that converts an image formed by the zoom lens into an electrical signal.

BRIEF DESCRIPTION OF THE DRAWINGS

FIG. 1A, FIG. 1B, and FIG. 1C are lens cross-sectional diagrams of a zoom lens of Example 1 at a time of focusing to an object at infinity, in which FIG. 1A is a lens cross-sectional diagram at the wide-angle end, FIG. 1B is a lens cross-sectional diagram at the intermediate focal length state, and FIG. 1C is a lens cross-sectional diagram at the telephoto end;

FIG. 2A, FIG. 2B, and FIG. 2C are lens cross-sectional diagrams of a zoom lens of Example 2 at a time of focusing to an object at infinity, in which FIG. 2A is a lens cross-sectional diagram at the wide-angle end, FIG. 2B is a lens cross-sectional diagram at the intermediate focal length state, and FIG. 2C is a lens cross-sectional diagram at the telephoto end;

FIG. 3A, FIG. 3B, and FIG. 3C are lens cross-sectional diagrams of a zoom lens of Example 3 at a time of focusing to an object at infinity, in which FIG. 3A is a lens cross-sectional diagram at the wide-angle end, FIG. 3B is a lens cross-sectional diagram at the intermediate focal length state, and FIG. 3C is a lens cross-sectional diagram at the telephoto end;

FIG. 4A, FIG. 4B, and FIG. 4C are lens cross-sectional diagrams of a zoom lens of Example 4 at a time of focusing to an object at infinity, in which FIG. 4A is a lens cross-sectional diagram at the wide-angle end, FIG. 4B is a lens cross-sectional diagram at the intermediate focal length state, and FIG. 4C is a lens cross-sectional diagram at the telephoto end;

FIG. 5A, FIG. 5B, and FIG. 5C are lens cross-sectional diagrams of a zoom lens of Example 5 at a time of focusing to an object at infinity, in which FIG. 5A is a lens cross-sectional diagram at the wide-angle end, FIG. 5B is a lens cross-sectional diagram at the intermediate focal length state, and FIG. 5C is a lens cross-sectional diagram at the telephoto end;

FIG. 6A, FIG. 6B, FIG. 6C, FIG. 6D, FIG. 6E, FIG. 6F, FIG. 6G, FIG. 6H, FIG. 6I, FIG. 6J, FIG. 6K, and FIG. 6L are diagrams showing spherical aberration (SA), astigmatism (AS), distortion (DT), and chromatic aberration of magnification (CC) of the zoom lens of Example 1 at a time of focusing to an object at infinity, in which FIG. 6A, FIG. 6B, FIG. 6C, and FIG. 6D show a state at the wide-angle end, FIG. 6E, FIG. 6F, FIG. 6G, and FIG. 6H show a state at the intermediate focal length state, and FIG. 6I, FIG. 6J, FIG. 6K, and FIG. 6L show a state at the telephoto end;

FIG. 7A, FIG. 7B, FIG. 7C, FIG. 7D, FIG. 7E, FIG. 7F, FIG. 7G, FIG. 7H, FIG. 7I, FIG. 7J, FIG. 7K, and FIG. 7L are diagrams showing spherical aberration (SA), astigmatism (AS), distortion (DT), and chromatic aberration of magnification (CC) of the zoom lens of Example 2 at a time of focusing to an object at infinity, in which FIG. 7A, FIG. 7B, FIG. 7C, and FIG. 7D show a state at the wide-angle end, FIG. 7E, FIG. 7F, FIG. 7G, and FIG. 7H show a state at the intermediate focal length state, and FIG. 7I, FIG. 7J, FIG. 7K, and FIG. 7L show a state at the telephoto end;

FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L are diagrams showing spherical aberration (SA), astigmatism (AS), distortion (DT), and chromatic aberration of magnification (CC) of the zoom lens of Example 3 at a time of focusing to an object at infinity, in which FIG. 8A, FIG. 8B, FIG. 8C, and FIG. 8D show a state at the wide-angle end, FIG. 8E, FIG. 8F, FIG. 8G, and FIG. 8H show a state at the intermediate focal length state, and FIG. 8I, FIG. 8J, FIG. 8K, and FIG. 8L show a state at the telephoto end;

FIG. 9A, FIG. 9B, FIG. 9C, FIG. 9D, FIG. 9E, FIG. 9F, FIG. 9G, FIG. 9H, FIG. 9I, FIG. 9J, FIG. 9K, and FIG. 9L show diagrams showing spherical aberration (SA), astigmatism (AS), distortion (DT), and chromatic aberration of magnification (CC) of the zoom lens of Example 4 at a time of focusing to an object at infinity, in which FIG. 9A, FIG. 9B, FIG. 9C, and FIG. 9D show a state at the wide-angle end, FIG. 9E, FIG. 9F, FIG. 9G, and FIG. 9H show a state at the intermediate focal length state, and FIG. 9I, FIG. 9J, FIG. 9K, and FIG. 9L show a state at the telephoto end;

FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L are diagrams showing spherical aberration (SA), astigmatism (AS), distortion (DT), chromatic aberration of magnification (CC) of the zoom lens of Example 5 at a time of focusing to an object at infinity, in which FIG. 10A, FIG. 10B, FIG. 10C, and FIG. 10D show a state at the wide-angle end, FIG. 10E, FIG. 10F, FIG. 10G, and FIG. 10H show a state at the intermediate focal length state, and FIG. 10I, FIG. 10J, FIG. 10K, and FIG. 10L show a state at the telephoto end;

DETAILED DESCRIPTION OF THE INVENTION

Figure 2A:
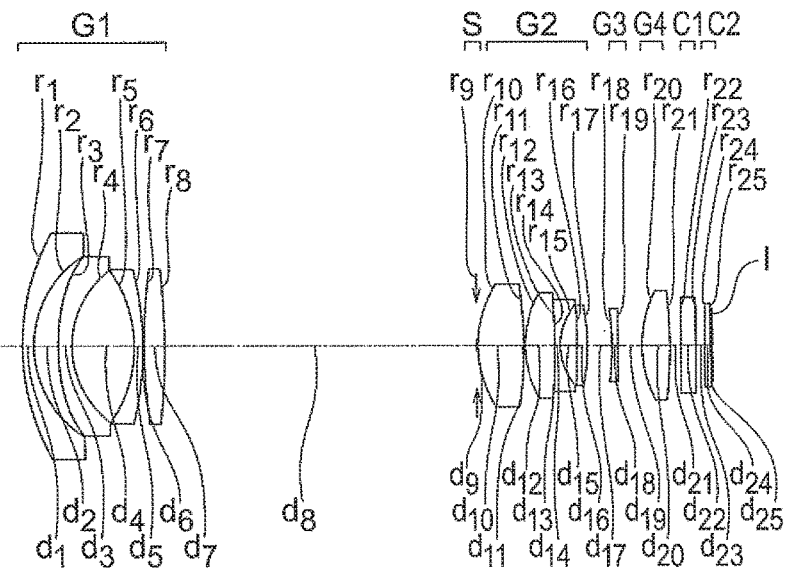

Prior to the explanation of examples, action and effect of embodiments according to certain aspects of the present invention will be described below. In the explanation of the action and effect of the embodiments concretely, the explanation will be made by citing concrete examples. However, similar to a case of the examples to be described later, aspects exemplified thereof are only some of the aspects included in the present invention, and there exists a large number of variations in these aspects. Consequently, the present invention is not restricted to the aspects that will be exemplified.

A basic configuration of the zoom lens of the present embodiment will be described. In the basic configuration, the zoom lens includes, in order from the object side, a first lens unit having negative refractive power, a second lens unit having positive refractive power, a third lens unit having negative refractive power, and a fourth lens unit having positive refractive power. At a time of zooming from a wide-angle end to a telephoto end, the distance between the first lens unit and the second lens unit is reduced.

By setting the refractive power of the first lens unit to negative refractive power, it is possible to achieve size reduction in the radial direction of the first lens unit while ensuring a wide angle of view. Furthermore, since the number of lens units included in the zoom lens can be reduced, it is also possible to reduce the total number of lenses included in the zoom lens. In this manner, setting the refractive power of the first lens unit to negative refractive power is advantageous for achieving a wider angle and reducing the size of the optical system and, in addition, leads to reduction in thickness of the lens frame and cost reduction.

Furthermore, by changing the distance between the first lens unit and the second lens unit, it is possible to obtain a zoom action. In this case, at a time of zooming from the wide-angle end to the telephoto end, it is preferable that the distance between the first lens unit and the second lens unit be reduced. By doing so, a large zoom action can be obtained.

Furthermore, it is preferable that the second lens unit be moved from the image side to the object side at a time of zooming from the wide-angle end to the telephoto end. By doing so, it is possible to increase a zoom action.

A zoom lens of a first embodiment will be described. The zoom lens of the first embodiment includes the basic configuration and, in addition, at a time of zooming from a wide-angle end to a telephoto end, the distance between the third lens unit and the fourth lens unit is increased, the fourth lens unit is fixed, and Conditional Expressions (1) and (2) below are satisfied:

$$2.5 \leq f_2/f_w \leq 4.5 \quad (1), \text{and}$$

$$4.3 \leq \Delta_{2GWT}/f_w \leq 8.0 \quad (2)$$

where $f_2$ is a focal length of the second lens unit, $f_w$ is a focal length of the entire zoom lens at the wide-angle end, and $\Delta_{2GWT}$ is a total amount of movement of the second lens unit at the time of zooming from the wide-angle end to the telephoto end.

By changing the distance between the third lens unit and the fourth lens unit, it is possible to obtain a zoom action. In this case, it is preferable that the distance between the third lens unit and the fourth lens unit be increased at a time of zooming from the wide-angle end to the telephoto end. By doing so, a large zoom action can be obtained.

Furthermore, at a time of zooming, the fourth lens unit is fixed whereby it becomes unnecessary to dispose a member or the like for driving the lens around the periphery of the fourth lens unit. Thus, it is possible to make the configuration of the whole zoom lens compact and to manufacture the zoom lens inexpensively.

Conditional Expression (1) is a regulation for the second lens unit that contributes to zooming and standardizes the focal length of the second lens unit by the focal length of the entire zoom lens at the wide-angle end.

By satisfying Conditional Expression (1), it is possible to appropriately keep the refractive power of the second lens unit relative to the focal length of the entire zoom lens at the wide-angle end. As a result, it is possible to provide a wider angle and a larger aperture without degrading the optical performance.

In a case of falling below a lower limit value of Conditional Expression (1), since the refractive power of the second lens unit is too large, the optical performance is deteriorated. Furthermore, in a case of exceeding an upper limit value of Conditional Expression (1), the refractive power of the second lens unit becomes too small. In this case, since the aberration correction capability in the second lens unit is insufficient, the optical performance is deteriorated. Furthermore, in a case of exceeding the upper limit value, since the refractive power of the second lens unit becomes small, it becomes difficult to increase the zoom ratio. If the zoom ratio is to be increased, since the distance of movement of the second lens unit is increased, it becomes difficult to reduce the total length of the entire zoom lens.

Conditional Expression (2) regulates the amount of movement of the second lens unit and standardizes the amount of movement of the second lens unit by the focal length at the wide-angle end of the entire zoom lens. The total amount of movement of the second lens unit is the difference between the position of the second lens unit at the wide-angle end and the position of the second lens unit at the telephoto end.

In a case of falling below a lower limit value of Conditional Expression (2), the total amount of movement of the second lens unit becomes small. In this case, the refractive power of the second lens unit must be increased excessively in order to increase the zoom ratio. However, if the refractive power of the second lens unit is increased, the optical performance is deteriorated. In this manner, falling below the lower limit value of Conditional Expression (2) leads to deterioration of the optical performance.

In a case of exceeding an upper limit value of the Conditional Expression (2), the total amount of movement of the second lens unit becomes too large. In this case, the refractive power of the second lens unit has to be reduced. If so, since the aberration correction capability in the second lens unit is insufficient, the optical performance is deteriorated. In this manner, exceeding the upper limit value of Conditional Expression (2) leads to deterioration of the optical performance. Furthermore, since the total length of the entire zoom lens is increased, it becomes difficult to adopt a compact configuration.

A zoom lens of a second embodiment will be described. The zoom lens of the second embodiment includes the basic configuration and, in addition, at a time of zooming from a wide-angle end to a telephoto end, the first lens unit is fixed, the distance between the second lens unit and the third lens unit is increased, the fourth lens unit moves to the image side, and Conditional Expressions (1a) and (2a) below are satisfied:

$$f_2/f_w \leq 5.0 \quad (1a), \text{ and}$$

$$4.3 \leq \Delta_{2GWT}/f_w \quad (2a)$$

where $f_2$ is the focal length of the second lens unit, $f_w$ is the focal length of the entire zoom lens at the wide-angle end, and $\Delta_{2GWT}$ is the total amount of movement of the second lens unit at the time of zooming from the wide-angle end to the telephoto end.

By changing the distance between the second lens unit and the third lens unit, it is possible to obtain a zoom action. In this case, it is preferable that the distance between the second lens unit and the third lens unit be increased at a time of zooming from the wide-angle end to the telephoto end. By doing so, a large zoom action can be obtained.

Furthermore, at a time of zooming, the first lens unit is fixed whereby it becomes unnecessary to dispose a member or the like for driving the lens around the periphery of the first lens unit. Thus, it is possible to make the configuration of the whole zoom lens compact and to manufacture the zoom lens inexpensively.

The technical meaning of Conditional Expression (1a) is the same as the technical meaning of Conditional Expression (1). Furthermore, the technical meaning of Conditional Expression (2a) is the same as the technical meaning of Conditional Expression (2).

In the zoom lens of the first embodiment and the zoom lens of the second embodiment (hereinafter referred to as "the zoom lens of the present embodiment"), it is preferable that the first lens unit include four lenses, namely, a negative lens, a negative lens, a negative lens, and a positive lens in order from the object side.

To achieve a wider angle without degrading the optical performance, the number of lenses included in the first lens unit may be increased. By doing so, it becomes possible to sufficiently ensure the aberration correction capability in the first lens unit. However, if there are too many lenses, the size of the first lens unit is increased.

Then, the first lens unit is constituted with three negative lenses and one positive lens whereby it is possible to prevent size increase of the first lens unit while sufficiently ensuring the aberration correction capability in the first lens unit.

Furthermore, since the aberration correction capability in the first lens unit can be sufficiently ensured, it becomes unnecessary to excessively increase the refractive power of the second lens unit. That is, since the refractive power of the second lens unit can be kept appropriately, it is possible to prevent increase of the amount of aberration.

In the zoom lens of the present embodiment, it is preferable that Conditional Expression (3) below be satisfied:

$$0.5 < (r_{f11} + r_{R11})/(r_{f11} - r_{R11}) < 5.0 \quad (3)$$

where $r_{f11}$ is a radius of curvature of the object-side surface of the lens closest to the object side in the first lens unit, and $r_{R11}$ is a radius of curvature of the image-side surface of the lens closest to the object side in the first lens unit.

Conditional Expression (3) is a formula that regulates the shape factor of the lens positioned closest to the object side (hereinafter referred to as "first lens") of the lenses included in the first lens unit.

In a case of falling below a lower limit value of Conditional Expression (3), since the refractive power of the first lens becomes too large, the optical performance is deteriorated. In this manner, falling below the lower limit value of Conditional Expression (3) leads to deterioration of the optical performance and thus is not preferable.

In a case of exceeding an upper limit value of Conditional Expression (3), the refractive power of the first lens becomes too small. In this case, since the aberration correction capability in the first lens unit is insufficient, the optical performance is deteriorated. In this manner, exceeding the upper limit value of Conditional Expression (3) leads to deterioration of the optical performance and thus is not preferable.

In the zoom lens of the first embodiment, it is preferable that Conditional Expression (4) below be satisfied:

$$-5.0 < (r_{f13} + r_{R13})/(r_{f13} - r_{R13}) < -0.5 \quad (4)$$

where $r_{f13}$ is a radius of curvature of the object-side surface of the third lens from the object side in the first lens unit, and $r_{R13}$ is a radius of curvature of the image-side surface of the third lens from the object side in the first lens unit.

Conditional Expression (4) is a formula that regulates the shape factor of the lens in the third position from the object side (hereinafter referred to as "third lens") of the lenses included in the first lens unit.

In a case of falling below a lower limit value of Conditional Expression (4), the refractive power of the third lens becomes too small. In this case, since the aberration correction capability in the first lens unit is insufficient, the optical performance is deteriorated. In this manner, falling below the lower limit value of Conditional Expression (4) leads to deterioration of the optical performance.

In a case of exceeding an upper limit value of Conditional Expression (4) is exceeded, since the refractive power of the third lens becomes too large, the optical performance is deteriorated. In this manner, exceeding the upper limit value of Conditional Expression (4) leads to deterioration of the optical performance.

In the zoom lens of the present embodiment, it is preferable that the third lens unit move along the optical axis at a time of focusing and that Conditional Expression (5) below be satisfied:

$$0.5 < |(1-(mg3t)^2) \times (mg4t)^2| < 2.0 \quad (5)$$

where mg3t is a lateral magnification at the telephoto end of the third lens unit, and mg4t is a lateral magnification at the telephoto end of the fourth lens unit.

Conditional Expression (5) regulates the focus sensitivity at the telephoto end.

In a case of falling below a lower limit value of Conditional Expression (5), since the amount of movement of the third lens unit at a time of focusing is large, the total length of the zoom lens is increased. In this manner, falling below the lower limit of Conditional Expression (5) leads to size increase of the optical system.

In a case of exceeding an upper limit value of Conditional Expression (5), decentration sensitivity becomes increased. In this case, even when the amount of decentration is very small, the optical performance is deteriorated. In this manner, exceeding the upper limit value of Conditional Expression (5) leads to deterioration of the optical performance due to an assembly error.

In the zoom lens of the present embodiment, it is preferable that Conditional Expression (6) below be satisfied:

$$2.0(°/mm) < \omega_w/f_2 \le 5.0(°/mm) \quad (6)$$

where $\omega_w$ is a half angle of view at the wide-angle end of the entire zoom lens, and $f_2$ is the focal length of the second lens unit.

Conditional Expression (6) is a formula for the ratio between the angle of view at the wide-angle end and the focal length of the second lens unit. By satisfying Conditional Expression (6), it is possible to appropriately keep the refractive power of the second lens unit for the angle of view at the wide-angle end. As a result, it is possible to achieve a wider angle and a larger aperture without deteriorating the optical performance.

In a case of falling below a lower limit value of Conditional Expression (6), the refractive power of the second lens unit becomes too small for the angle of view at the wide-angle end. In this case, since the aberration correction capability in the second lens unit is insufficient, the optical performance is deteriorated. In this manner, falling below the lower limit value of Conditional Expression (6) leads to deterioration of the optical performance.

In a case of exceeding an upper limit value of Conditional Expression (6), since the refractive power of the second lens unit becomes too large for the angle of view at the wide-angle end, the optical performance is deteriorated. In this manner, exceeding the upper limit value of Conditional Expression (6) leads to deterioration of the optical performance.

Furthermore, the image pickup apparatus of the present embodiment includes the zoom lens described above and an image pickup element that converts an image formed by the zoom lens into an electrical signal.

By doing so, it is possible to implement an image pickup apparatus excellent in portability and capable of picking up an image in a wide range at high resolution.

Moreover, it is preferable to satisfy simultaneously a plurality of abovementioned arrangements mutually. Moreover, an arrangement may be made such that some of the arrangements are satisfied simultaneously. For instance, an arrangement may be made such that a zoom lens other than the abovementioned zoom lens is used as one of the abovementioned wide angle lenses or is used in the image pickup apparatus.

Regarding conditional expressions, each conditional expression may be let to be satisfied separately. When such an arrangement is made, it is favorable as it is easy to achieve an effect of each conditional expression.

Moreover, for each conditional expression, the lower limit value or the upper limit value may be changed as shown below. Changing the upper limit value and the lower limit value as given below is favorable, as the effect of each conditional expression will be even more assured.

It is preferable that Conditional Expression (1) be as follows:

$$2.9 \leq f_2/f_w \leq 4.25 \qquad (1)'$$

It is preferable that Conditional Expression (1a) be as follows:

$$2.9 \leq f_2/f_w \leq 4.25 \qquad (1a)'$$

It is preferable that Conditional Expression (2) be as follows:

$$5.0 \leq \Delta_{2GWT}/f_w \leq 8.0 \qquad (2)'$$

It is preferable that Conditional Expression (2a) be as follows:

$$5 \leq \Delta_{2GWT}/f_w \leq 7.0 \qquad (2a)'$$

It is preferable that Conditional Expression (6) be as follows:

$$3.0(°/mm) < \omega_w/f_2 \leq 4.7(°/mm) \qquad (6)'$$

Examples of a zoom lens will be described below by referring to the accompanying diagrams. However, the present invention is not restricted by the examples described below.

Examples 1 to 5 of the zoom lens will be described below. The lens cross-sectional diagrams of Examples 1 to 5 are respectively shown in FIG. 1A to FIG. 1C, FIG. 2A to FIG. 2C, FIG. 3A to FIG. 3C, FIG. 4A to FIG. 4C, and FIG. 5A to FIG. 5C. In the figures, FIG. 1A, FIG. 2A, FIG. 3A, FIG. 4A, and FIG. 5A are lens cross-sectional diagrams at the wide-angle end, FIG. 1B, FIG. 2B, FIG. 3B, FIG. 4B, and FIG. 5B are lens cross-sectional diagrams at the intermediate focal length state, and FIG. 1C, FIG. 2C, FIG. 3C, FIG. 4C, and FIG. 5C are lens cross-sectional diagrams at the telephoto end. FIG. 1A to FIG. 5A, FIG. 1B to FIG. 5B, and FIG. 1C to FIG. 5C all are lens cross-sectional diagrams at a time of focusing to an object at infinity.

A first lens unit is denoted by G1, a second lens unit is denoted by G2, a third lens unit is denoted by G3, a fourth lens unit is denoted by G4, an aperture stop is denoted by S, cover glass is denoted by C1, C2 and an image plane in denoted by I.

Moreover, for cutting unnecessary light such as ghost and flare, a flare aperture may be disposed apart from the aperture stop. The flare aperture may be disposed at any of locations namely, on the object side of the first lens unit, between the first lens unit and the second lens unit, between the second lens unit and the third lens unit, between the third lens unit and the fourth lens unit, and between the fourth lens unit and the image plane.

A frame member is used as a light shielding portion of the flare aperture, and an arrangement may be made such that the frame member cuts flare light ray, or the light shielding portion may be configured by some other member. Moreover, the light shielding portion may be printed directly on the optical system, or may be painted directly on the optical system. Moreover, a seal etc. may be stuck directly on the optical system as the light shielding portion.

Moreover, a shape of the light shielding portion may be any shape such as a circular shape, an elliptical shape, a rectangular shape, a polygonal shape, and a range surrounded by a function curve. Furthermore, not only unnecessary light beam but also a light beam such as coma flare around a screen may be cut.

Moreover, the ghost and the flare may be reduced by applying an antireflection coating on each lens. A multilayer coating is desirable as it enables to reduce the ghost and the flare effectively. Moreover, infrared-cutting coating may be applied to lens surfaces and the cover glass.

For preventing the occurrence of the ghost and the flare, generally, the antireflection coating is applied to a surface of a lens in contact with air. On the other hand, at a cemented surface of a cemented lens, a refractive index of an adhesive is sufficiently higher than a refractive index of air. Therefore, in many cases, a reflectance of the cemented surface of the cemented lens is originally of the level of a single-layer coating or lower. Therefore, coating is applied to the cemented surface of the cemented lens only in few cases. However, when the antireflection coating is applied positively even to the cemented surface, it is possible to reduce further the ghost and the flare. Therefore, it is possible to achieve a more favorable image.

Particularly, recently, a glass material having a high refractive index has been used widely. The glass material having a high refractive index, being highly effective in aberration correction, has been used widely in an optical system of cameras. However, when the glass material having a high refractive index is used as a cemented lens, even a reflection at the cemented surface becomes unignorable. In such a case, applying the antireflection coating on the cemented surface is particularly effective.

An effective usage of the cemented-surface coating has been disclosed in Japanese Patent Application Laid-open Publication Nos. Hei 2-27301, No. 2001-324676, No. 2005-92115, and U.S. Pat. No. 7,116,482.

In these patent literatures, a cemented lens surface coating in a first lens unit of a positive-lead zoom lens in particular, has been described. Therefore, Ii is preferable to apply the cemented-surface coating to the cemented lens surface in the front lens unit having a positive refractive power as it has been disclosed in these patent literatures.

As a coating material to be used, according to a refractive index of the adhesive material and a refractive index of the lens which is a base, coating materials such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ having a comparatively higher refractive index, and coating materials such as $MgF_2$, $SiO_2$, and $Al_2O_3$ having a comparatively lower refractive index may be selected appropriately, and set to a film thickness that satisfies phase conditions.

Naturally, similar to the coating on the surface of the lens in contact with air, the coating on the cemented surface may also be let to be a multilayer coating. By combining appropriately a film thickness and a coating material of number of films not less than in two layers, it is possible to reduce further the reflectance, and to control spectral characteristics and angular characteristics of reflectance. Moreover, it is needless to mention that for the cemented surface of lenses other than the lenses in the front lens unit, it is effective to apply the coating on the cemented surface based on a similar idea.

As shown in FIG. 1A, FIG. 1B, and FIG. 1C, the zoom lens of Example 1 includes, in order from the object side to the image side, a first lens unit G1 having negative refractive power, a second lens unit G2 having positive refractive power, a third lens unit G3 having negative refractive power, and a fourth lens unit G4 having positive refractive power. An aperture stop S is disposed on the object side of the second lens unit G2.

A parallel flat plate PL is disposed on the object side of the first lens unit G1. Furthermore, a cover glass C1 and a cover glass C2 are disposed on the image side of the fourth lens unit G4. The cover glass C2 is a cover glass of the image pickup element.

The first lens unit G1 includes a negative meniscus lens L1 having a convex surface facing toward the object side, a negative meniscus lens L2 having a convex surface facing toward the object side, a negative meniscus lens L3 having a convex surface facing toward the image side, and a biconvex positive lens L4.

The second lens unit G2 includes a biconvex positive lens L5, a biconvex positive lens L6, a biconcave negative lens L7, and a biconvex positive lens L8. Here, the biconvex positive lens L6 and the biconcave negative lens L7 are cemented together.

The third lens unit G3 includes a biconcave negative lens L9.

The fourth lens unit G4 includes a biconvex positive lens L10.

At a time of zooming from the wide-angle end to the telephoto end, each lens unit moves as follows. The first lens unit G1 moves to the image side and thereafter moves to the object side. The second lens unit G2 moves to the object side. The third lens unit G3 moves to the object side. The fourth lens unit G4 is fixed. The aperture stop S moves to the object side together with the second lens unit G2.

Aspheric surfaces are provided on six surfaces in total, namely, both surfaces of the negative meniscus lens L2, both surfaces of the biconvex positive lens L5, and both surfaces of the biconvex positive lens L10.

Figure 2B:
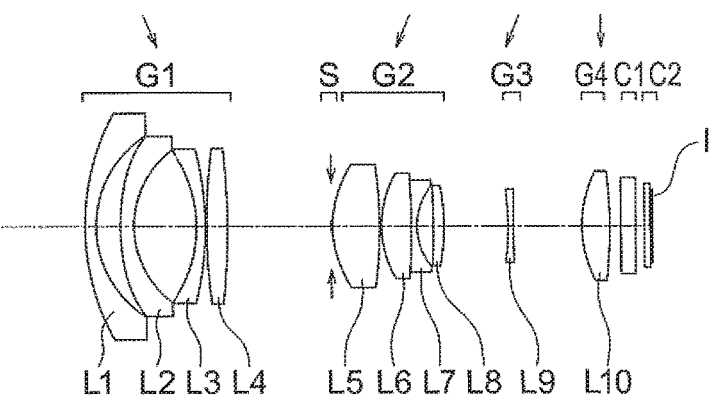
Figure 2C:
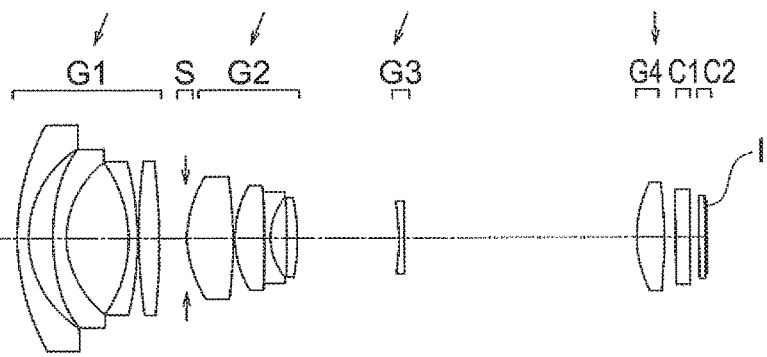

As shown in FIG. 2A, FIG. 2B, and FIG. 2C, the zoom lens of Example 2 includes, in order from the object side to the image side, a first lens unit G1 having negative refractive power, a second lens unit G2 having positive refractive power, a third lens unit G3 having negative refractive power, and a fourth lens unit G4 having positive refractive power. An aperture stop S is disposed on the object side of the second lens unit G2.

A cover glass C1 and a cover glass C2 are disposed on the image side of the fourth lens unit G4. The cover glass C2 is a cover glass of the image pickup element.

The first lens unit G1 includes a negative meniscus lens L1 having a convex surface facing toward the object side, a negative meniscus lens L2 having a convex surface facing toward the object side, a negative meniscus lens L3 having a convex surface facing toward the image side, and a biconvex positive lens L4.

The second lens unit G2 includes a biconvex positive lens L5, a biconvex positive lens L6, a biconcave negative lens L7, and a positive meniscus lens L8 having a convex surface facing toward the image side. Here, the biconvex positive lens L6 and the biconcave negative lens L7 are cemented together.

The third lens unit G3 includes a biconcave negative lens L9.

The fourth lens unit G4 includes a biconvex positive lens L10.

At a time of zooming from the wide-angle end to the telephoto end, each lens unit moves as follows. The first lens unit G1 moves to the image side and thereafter moves to the object side. The second lens unit G2 moves to the object side. The third lens unit G3 moves to the object side. The fourth lens unit G4 is fixed. The aperture stop S moves to the object side together with the second lens unit G2.

Aspheric surfaces are provided on six surfaces in total, namely, both surfaces of the negative meniscus lens L2, both surfaces of the biconvex positive lens L5, and both surfaces of the biconvex positive lens L10.

Figure 3A:
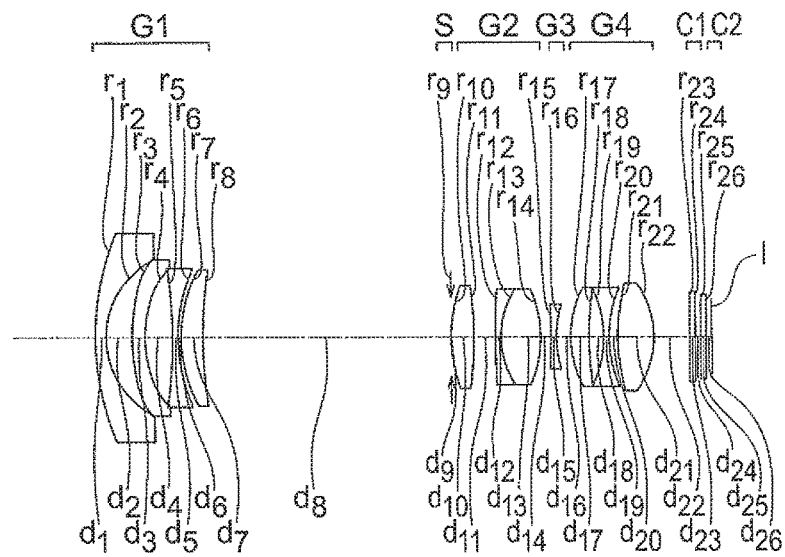
Figure 3B:
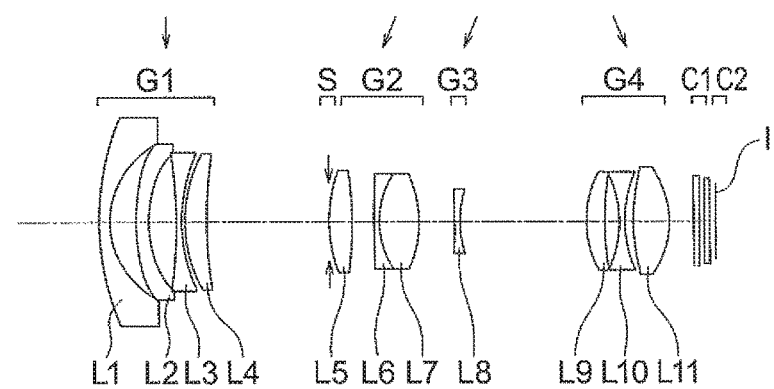
Figure 3C:
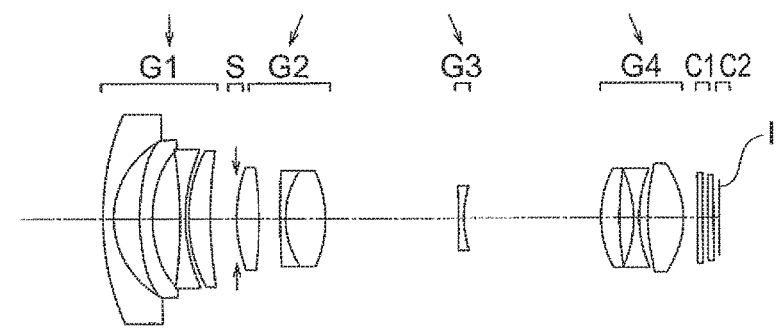

As shown in FIG. 3A, FIG. 3B, and FIG. 3C, the zoom lens of Example 3 includes, in order from the object side to the image side, a first lens unit G1 having negative refractive power, a second lens unit G2 having positive refractive power, a third lens unit G3 having negative refractive power, and a fourth lens unit G4 having positive refractive power. An aperture stop S is disposed on the object side of the second lens unit G2.

A cover glass C1 and a cover glass C2 are disposed on the image side of the fourth lens unit G4. The cover glass C2 is a cover glass of the image pickup element.

The first lens unit G1 includes a negative meniscus lens L1 having a convex surface facing toward the object side, a negative meniscus lens L2 having a convex surface facing toward the object side, a biconcave negative lens L3, and a positive meniscus lens L4 having a convex surface facing toward the object side.

The second lens unit G2 includes a biconvex positive lens L5, a negative meniscus lens L6 having a convex surface facing toward the object side, and a biconvex positive lens L7. Here, the negative meniscus lens L6 and the biconvex positive lens L7 are cemented together.

The third lens unit G3 includes a biconcave negative lens L8.

The fourth lens unit G4 includes a positive meniscus lens L9 having a convex surface facing toward the object side, a biconcave negative lens L10, and a biconvex positive lens L11.

At a time of zooming from the wide-angle end to the telephoto end, each lens unit moves as follows. The first lens unit G1 is fixed. The second lens unit G2 moves to the object side. The third lens unit G3 moves to the object side and thereafter moves to the image side. The fourth lens unit G4 moves to the image side. The aperture stop S moves to the object side together with the second lens unit G2.

Aspheric surfaces are provided on six surfaces in total, namely, both surfaces of the negative meniscus lens L2, both surfaces of the biconvex positive lens L5, and both surfaces of the biconvex positive lens L11.

Figure 4A:
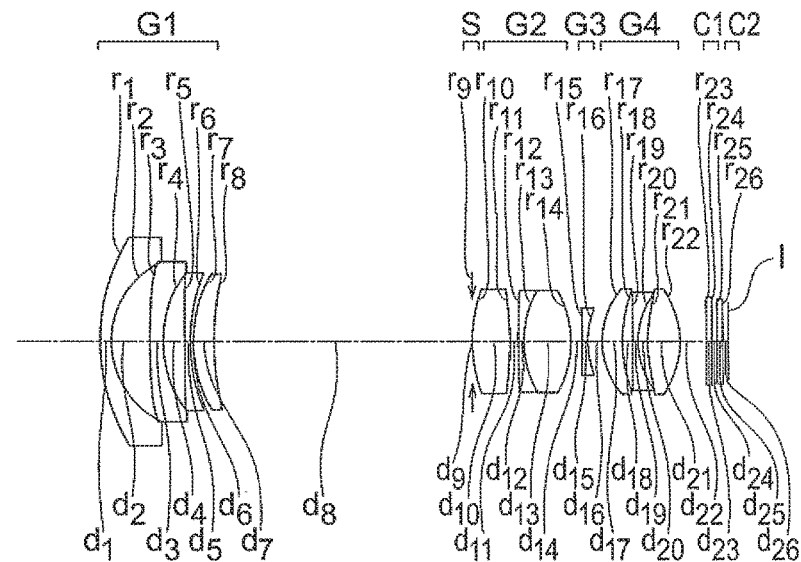
Figure 4B:
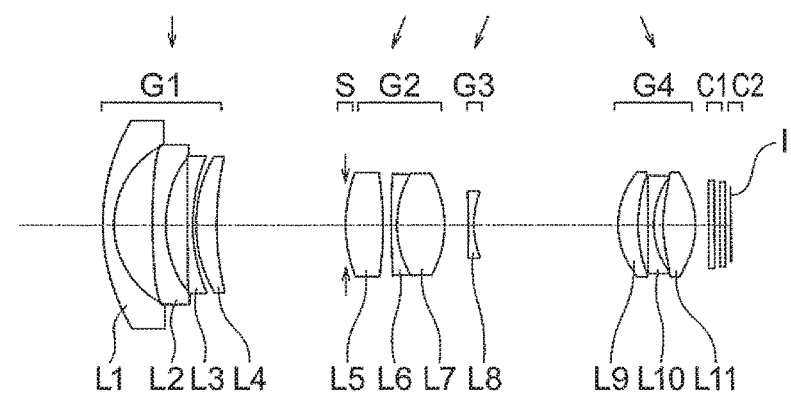
Figure 4C:
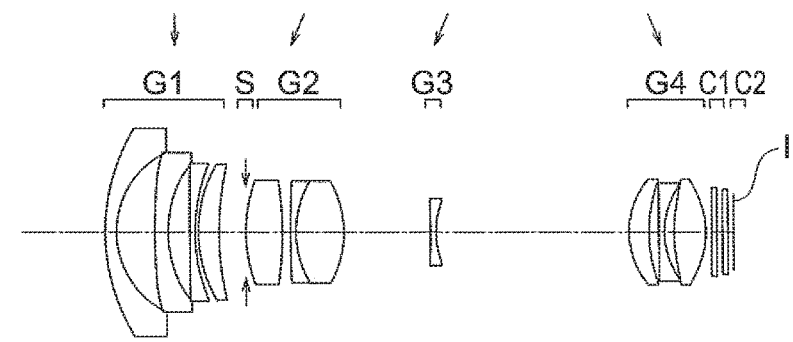

As shown in FIG. 4A, FIG. 4B, and FIG. 4C, the zoom lens of Example 4 includes, in order from the object side to the image side, a first lens unit G1 having negative refractive power, a second lens unit G2 having positive refractive power, a third lens unit G3 having negative refractive power, and a fourth lens unit G4 having positive refractive power. An aperture stop S is disposed on the object side of the second lens unit G2.

A cover glass C1 and a cover glass C2 are disposed on the image side of the fourth lens unit G4. The cover glass C2 is a cover glass of the image pickup element.

The first lens unit G1 includes a negative meniscus lens L1 having a convex surface facing toward the object side, a negative meniscus lens L2 having a convex surface facing toward the object side, a negative meniscus lens L3 having a convex surface facing toward the object side, and a positive meniscus lens L4 having a convex surface facing toward the object side.

The second lens unit G2 includes a biconvex positive lens L5, a negative meniscus lens L6 having a convex surface facing toward the object side, and a biconvex positive lens L7. Here, the negative meniscus lens L6 and the biconvex positive lens L7 are cemented together.

The third lens unit G3 includes a biconcave negative lens L8.

The fourth lens unit G4 includes a positive meniscus lens L9 having a convex surface facing toward the object side, a biconcave negative lens L10, and a biconvex positive lens L11.

At a time of zooming from the wide-angle end to the telephoto end, each lens unit moves as follows. The first lens unit G1 is fixed. The second lens unit G2 moves to the object side. The third lens unit G3 moves to the object side. The fourth lens unit G4 moves to the image side. The aperture stop S moves to the object side together with the second lens unit G2.

Aspheric surfaces are provided on six surfaces in total, namely, both surfaces of the negative meniscus lens L2, both surfaces of the biconvex positive lens L5, and both surfaces of the biconvex positive lens L11.

Figure 5A:
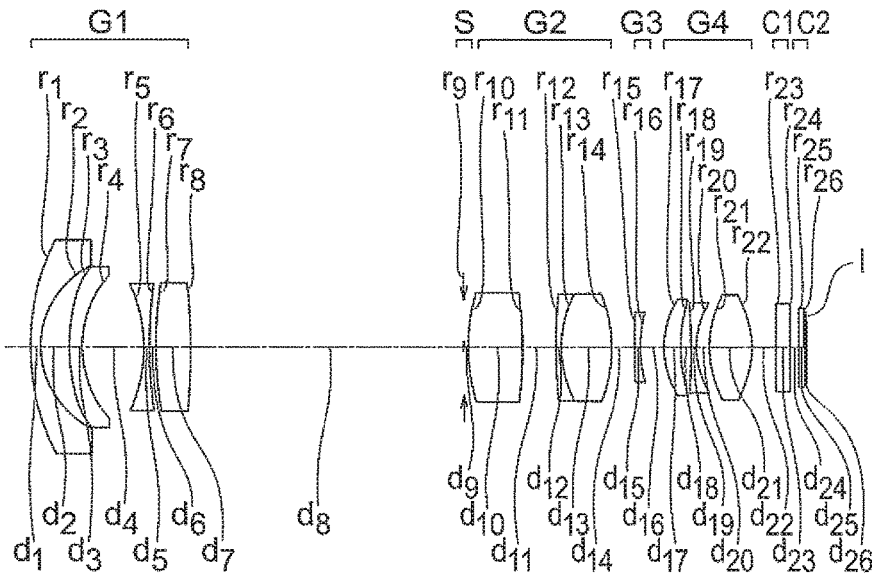
Figure 5B:
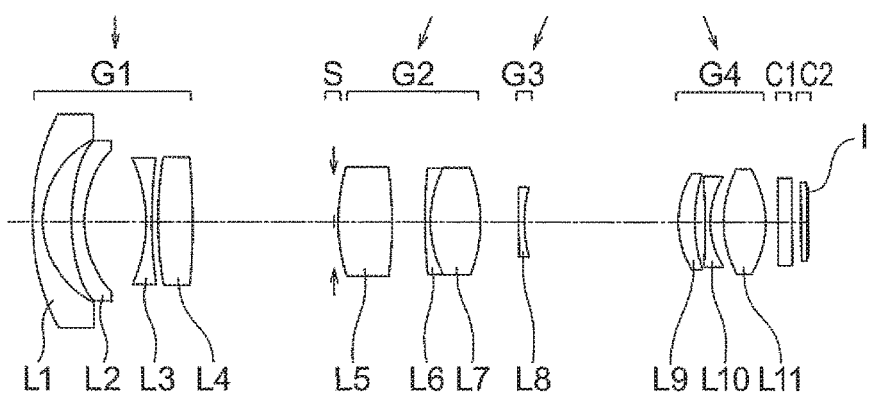
Figure 5C:
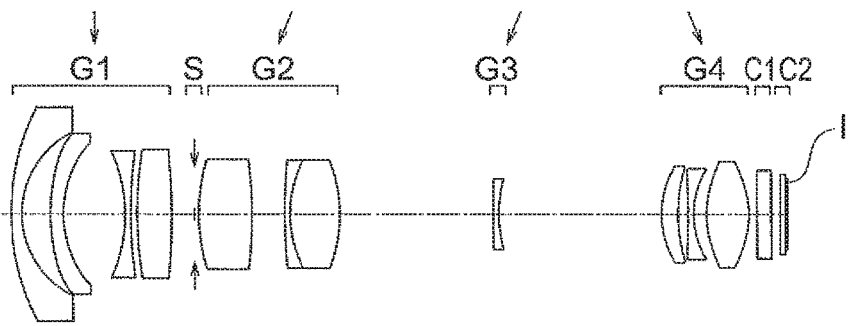
Figure 7A:
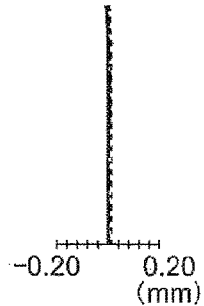
Figure 7B:
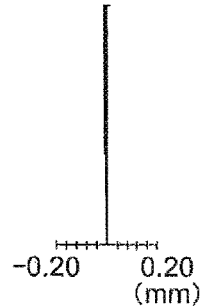
Figure 7C:
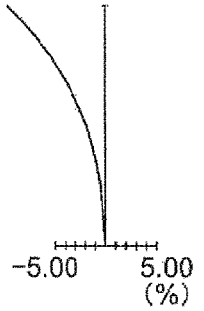
Figure 7D:
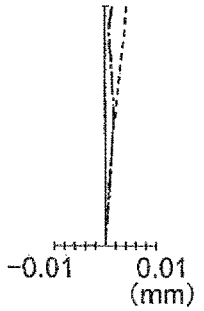
Figure 7E:
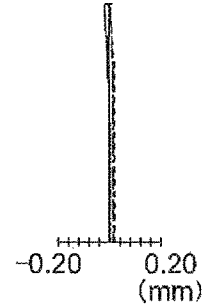
Figure 7F:
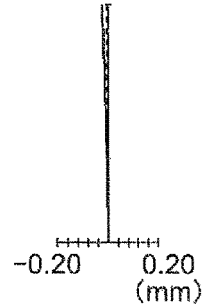
Figure 7G:
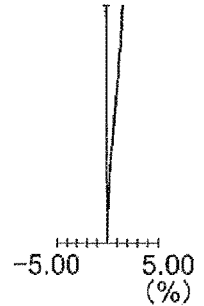
Figure 7H:
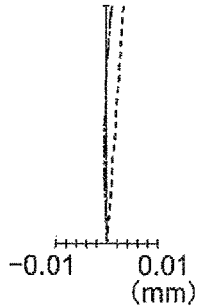
Figure 7I:
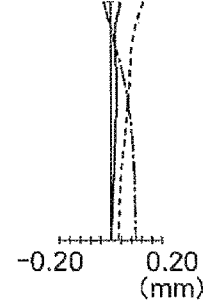
Figure 7J:
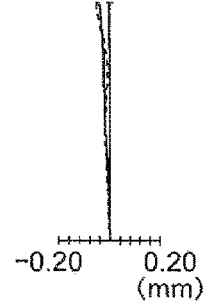
Figure 7K:
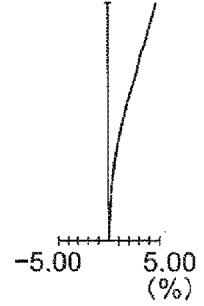
Figure 7L:
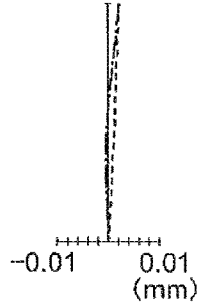
Figure 9A:
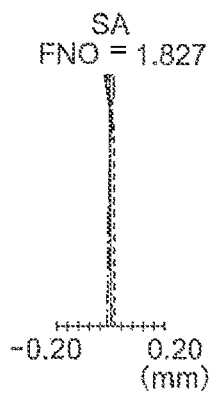
Figure 9B:
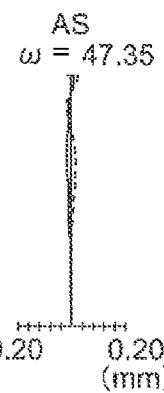
Figure 9C:
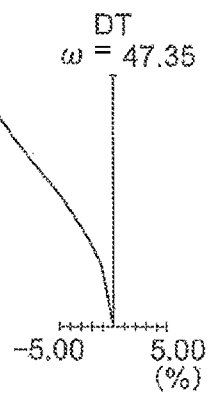
Figure 9D:
Figure 9E:
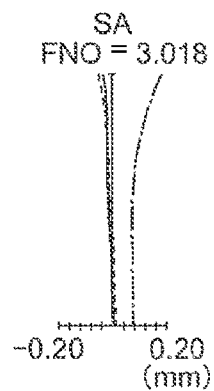
Figure 9F:
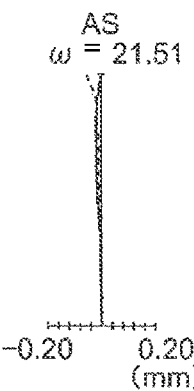
Figure 9G:
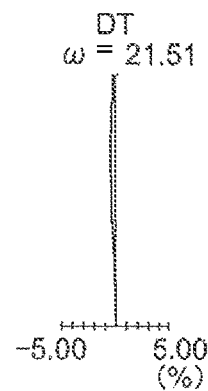
Figure 9H:
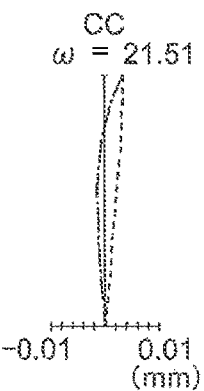
Figure 9I:
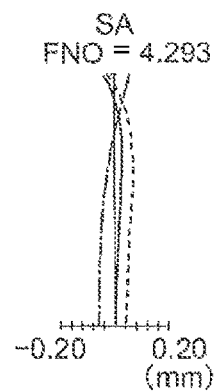
Figure 9J:
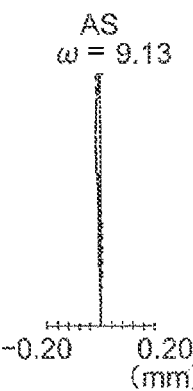
Figure 9K:
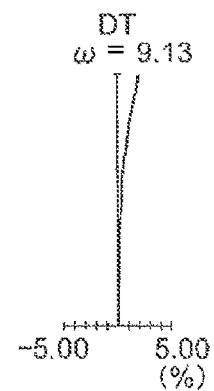
Figure 9L:
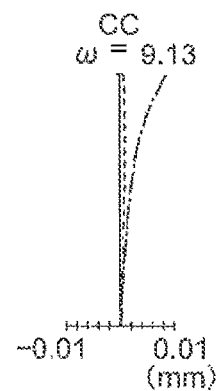

As shown in FIG. 5A, FIG. 5B, and FIG. 5C, the zoom lens of Example 5 includes, in order from the object side to the image side, a first lens unit G1 having negative refractive power, a second lens unit G2 having positive refractive power, a third lens unit G3 having negative refractive power, and a fourth lens unit G4 having positive refractive power. An aperture stop S is disposed on the object side of the second lens unit G2.

A cover glass C1 and a cover glass C2 are disposed on the image side of the fourth lens unit G4. The cover glass C2 is a cover glass of the image pickup element.

The first lens unit G1 includes a negative meniscus lens L1 having a convex surface facing toward the object side, a negative meniscus lens L2 having a convex surface facing toward the object side, a biconcave negative lens L3, and a biconvex positive lens L4.

The second lens unit G2 includes a biconvex positive lens L5, a negative meniscus lens L6 having a convex surface facing toward the object side, and a biconvex positive lens L7. Here, the negative meniscus lens L6 and the biconvex positive lens L7 are cemented together.

The third lens unit G3 includes a negative meniscus lens L8 having a convex surface facing toward the object side.

The fourth lens unit G4 includes a positive meniscus lens L9 having a convex surface facing toward the object side, a biconcave negative lens L10, and a biconvex positive lens L11.

At a time of zooming from the wide-angle end to the telephoto end, each lens unit moves as follows. The first lens unit G1 is fixed. The second lens unit G2 moves to the object side. The third lens unit G3 moves to the object side. The fourth lens unit G4 moves to the image side. The aperture stop S moves to the object side together with the second lens unit G2.

Aspheric surfaces are provided on six surfaces in total, namely, both surfaces of the negative meniscus lens L2, both surfaces of the biconvex positive lens L5, and both surfaces of the biconvex positive lens L11.

Numerical data of each example described above is shown below. Apart from symbols described above, r denotes radius of curvature of each lens surface, d denotes a distance between respective lens surfaces, nd denotes a refractive index of each lens for a d-line, vd denotes an Abbe constant for each lens, and * denotes an aspherical surface. Further, f denotes a focal length of the entire system, FNO. denotes an F number, ω denotes a half angle of view, IH denotes an image height, FB denotes a back focus, LTL is a distance from a frontmost lens surface to the rearmost lens surface plus back focus, and each of f1, f2 . . . is a focal length of each lens unit. Further, FB is a unit which is expressed upon air conversion of a distance from the lens backmost surface to a paraxial image surface.

Further, WE denotes a wide angle end, ST1 denotes an intermediate focal length state 1, ST2 denotes an intermediate focal length state 2, ST3 denotes an intermediate focal length state 3, and TE denotes a telephoto end. Here, ST1 is a focal length state between WE and ST2, and ST3 is a focal length state between ST2 and TE.

Moreover, a shape of an aspherical surface is defined by the following expression where the direction of the optical axis is represented by z, the direction orthogonal to the optical axis is represented by y, a conical coefficient is represented by k, aspherical surface coefficients are represented by A4, A6, A8, A10

$$Z=(y^2/r)/[1+\{1-(1+k)(y/r)^2\}^{1/2}]+A4y^4+A6y^6+A8y^8+A10y^{10}$$

Further, in the aspherical surface coefficients, 'e-n' (where, n is an integral number) indicates '$10^{-n}$'. Moreover, these symbols are commonly used in the following numerical data for each example.

EXAMPLE 1

| Unit mm | | | | |
|---|---|---|---|---|
| Surface data | | | | |
| Surface no. | r | d | nd | vd |
| 1 | ∞ | 1.00 | 1.51633 | 64.14 |
| 2 | ∞ | Variable | | |
| 3 | 16.483 | 1.00 | 1.90366 | 31.32 |
| 4 | 9.136 | 2.99 | | |
| 5* | 25.002 | 1.20 | 1.74156 | 49.21 |
| 6* | 7.954 | 5.71 | | |
| 7 | −10.201 | 0.80 | 1.58313 | 59.38 |
| 8 | −22.001 | 0.10 | | |
| 9 | 58.579 | 1.65 | 1.94595 | 17.98 |
| 10 | −58.579 | Variable | | |
| 11(Stop) | ∞ | 0.40 | | |
| 12* | 9.459 | 3.81 | 1.74156 | 49.21 |
| 13* | −45.759 | 0.59 | | |
| 14 | 10.603 | 2.45 | 1.59282 | 68.63 |
| 15 | −36.803 | 0.01 | 1.56384 | 60.67 |
| 16 | −36.803 | 0.50 | 1.85478 | 24.80 |
| 17 | 6.290 | 1.30 | | |
| 18 | 56.152 | 1.37 | 1.80100 | 34.97 |
| 19 | −18.872 | Variable | | |
| 20 | −34.286 | 0.70 | 1.84666 | 23.78 |
| 21 | 66.271 | Variable | | |
| 22* | 15.842 | 1.71 | 1.80477 | 40.89 |
| 23* | −23.970 | 1.00 | | |
| 24 | ∞ | 1.32 | 1.51633 | 64.14 |

-continued

| Unit mm | | | | |
|---|---|---|---|---|
| 25 | ∞ | 0.51 | | |
| 26 | ∞ | 0.50 | 1.51633 | 64.14 |
| 27 | ∞ | 0.53 | | |
| 28(Image plane) | ∞ | | | |

Aspherical surface data

5th surface k = 0.000
A4 = 9.42000e−05, A6 = −5.49990e−07, A8 = 1.73870e−08,
A10 = 4.18530e−11
6th surface k = 0.000
A4 = −1.17000e−04, A6 = −4.15020e−07, A8 = −5.20100e−08,
A10 = 1.27720e−09
12th surface k = 0.000
A4 = −1.08960e−04, A6 = −5.26660e−07, A8 = −1.60000e−08
13th surface k = 0.000
A4 = 1.07170e−04, A6 = −1.14070e−06
22th surface k = 0.000
A4 = −9.17380e−06, A6 = −2.07400e−05, A8 = 2.73460e−07
23th surface k = 0.000
A4 = 4.25320e−04, A6 = −4.21060e−05, A8 = 1.39450e−06,
A10 = −2.07310e−08

Zoom data

| | WE | ST2 | TE | ST1 | ST3 |
|---|---|---|---|---|---|
| f | 3.26 | 7.17 | 15.96 | 4.82 | 10.72 |
| FNO. | 1.85 | 2.61 | 4.44 | 2.16 | 3.35 |
| 2ω | 92.84 | 45.98 | 20.94 | 66.53 | 31.07 |
| IH | 3.084 | 3.084 | 3.084 | 3.084 | 3.084 |
| FB(in air) | 3.23 | 3.24 | 3.24 | 3.23 | 3.24 |
| LTL(in air) | 61.87 | 61.87 | 61.87 | 61.86 | 61.87 |
| d2 | 0.70 | 11.03 | 4.66 | 7.83 | 9.71 |
| d10 | 25.72 | 9.21 | 2.10 | 16.01 | 4.94 |
| d19 | 2.80 | 5.01 | 7.23 | 3.65 | 6.03 |
| d21 | 2.13 | 6.09 | 17.36 | 3.86 | 10.67 |
| d23 | 1.00 | 1.00 | 1.00 | 1.00 | 1.00 |

Unit focal length

| f1 = −10.00 | f2 = 12.10 | f3 = −26.60 | f4 = 12.08 |
|---|---|---|---|

EXAMPLE 2

| Unit mm | | | | |
|---|---|---|---|---|
| Surface data | | | | |
| Surface no. | r | d | nd | νd |
| 1 | 21.237 | 1.00 | 1.90366 | 31.32 |
| 2 | 9.656 | 2.18 | | |
| 3* | 20.483 | 1.20 | 1.74320 | 49.34 |
| 4* | 8.242 | 5.61 | | |
| 5 | −11.774 | 0.80 | 1.58313 | 59.38 |
| 6 | −27.643 | 0.10 | | |

-continued

| Unit mm | | | | |
|---|---|---|---|---|
| 7 | 50.637 | 1.86 | 1.94595 | 17.98 |
| 8 | −61.381 | Variable | | |
| 9(Stop) | ∞ | 0.10 | | |
| 10* | 9.520 | 4.14 | 1.74320 | 49.34 |
| 11* | −34.380 | 0.15 | | |
| 12 | 9.383 | 2.64 | 1.59282 | 68.63 |
| 13 | −76.181 | 0.01 | 1.56384 | 60.67 |
| 14 | −76.181 | 0.50 | 1.85478 | 24.80 |
| 15 | 5.652 | 1.48 | | |
| 16 | −85.942 | 0.94 | 1.83481 | 42.71 |
| 17 | −18.650 | Variable | | |
| 18 | −22.438 | 0.50 | 1.84666 | 23.78 |
| 19 | 569.643 | Variable | | |
| 20* | 11.154 | 2.53 | 1.80610 | 40.92 |
| 21* | −25.792 | 1.00 | | |
| 22 | ∞ | 1.32 | 1.51633 | 64.14 |
| 23 | ∞ | 0.84 | | |
| 24 | ∞ | 0.50 | 1.51633 | 64.14 |
| 25 | ∞ | 0.18 | | |
| 26(Image plane) | ∞ | | | |

Aspherical surface data

3rd surface k = 0.000
A4 = 5.69289e−05, A6 = 2.67169e−06, A8 = −3.76448e−08,
A10 = 2.78016e−10
4th surface k = 0.000
A4 = −1.39228e−04, A6 = 3.17797e−06, A8 = −5.57783e−08
10th surface k = 0.000
A4 = −1.21431e−04, A6 = −8.17976e−07, A8 = −8.66990e−09,
A10 = −1.56315e−10
11th surface k = 0.000
A4 = 1.03028e−04, A6 = −1.22739e−06
20th surface k = 0.000
A4 = 2.25035e−04, A6 = −9.59716e−06, A8 = 1.01254e−07
21st surface k = 0.000
A4 = 7.88355e−04, A6 = −2.98951e−05, A8 = 4.42555e−07

Zoom data

| | WE | ST2 | TE | ST1 | ST3 |
|---|---|---|---|---|---|
| f | 3.26 | 7.82 | 18.91 | 5.05 | 12.19 |
| FNO. | 1.87 | 2.81 | 4.27 | 2.24 | 3.79 |
| 2ω | 92.68 | 42.43 | 17.72 | 63.88 | 27.43 |
| IH | 3.084 | 3.084 | 3.084 | 3.084 | 3.084 |
| FB(in air) | 3.22 | 3.22 | 3.22 | 3.22 | 3.22 |
| LTL(in air) | 61.16 | 50.17 | 61.16 | 53.12 | 53.27 |
| d8 | 27.79 | 9.29 | 2.40 | 16.65 | 5.08 |
| d17 | 2.20 | 5.78 | 9.02 | 3.58 | 7.30 |
| d19 | 2.20 | 6.12 | 20.77 | 3.92 | 11.91 |
| d21 | 1.00 | 1.00 | 1.00 | 1.00 | 1.00 |

Unit focal length

| f1 = −11.02 | f2 = 12.61 | f3 = −25.49 | f4 = 9.96 |
|---|---|---|---|

EXAMPLE 3

Unit mm

Surface data

| Surface no. | r | d | nd | vd |
|---|---|---|---|---|
| 1 | 25.027 | 1.00 | 1.74320 | 49.34 |
| 2 | 8.213 | 2.38 | | |
| 3* | 16.042 | 1.20 | 1.74320 | 49.34 |
| 4* | 10.142 | 2.58 | | |
| 5 | −43.157 | 0.50 | 1.66672 | 48.32 |
| 6 | 15.463 | 0.30 | | |
| 7 | 13.383 | 2.01 | 1.94595 | 17.98 |
| 8 | 40.651 | Variable | | |
| 9(Stop) | ∞ | 0.00 | | |
| 10* | 13.211 | 2.10 | 1.80610 | 40.92 |
| 11* | −29.319 | 1.99 | | |
| 12 | 100.204 | 0.50 | 1.84666 | 23.78 |
| 13 | 8.271 | 3.65 | 1.49700 | 81.54 |
| 14 | −10.835 | Variable | | |
| 15 | −56.749 | 0.50 | 1.49700 | 81.54 |
| 16 | 10.099 | Variable | | |
| 17 | 9.853 | 1.68 | 1.72916 | 54.68 |
| 18 | 29.167 | 1.33 | | |
| 19 | −10.593 | 0.50 | 1.59270 | 35.31 |
| 20 | 11.429 | 0.78 | | |
| 21* | 15.172 | 3.36 | 1.80610 | 40.92 |
| 22* | −7.758 | Variable | | |
| 23 | ∞ | 0.50 | 1.51633 | 64.14 |
| 24 | ∞ | 0.50 | | |
| 25 | ∞ | 0.50 | 1.51633 | 64.14 |
| 26 | ∞ | 0.53 | | |
| 27(Image plane) | ∞ | | | |

Aspherical surface data

3rd surface k = 0.000
A4 = −6.27987e−04, A6 = 2.29887e−05, A8 = −2.50381e−07,
A10 = 1.10380e−09

4th surface k = 0.000
A4 = −7.39446e−04, A6 = 2.69435e−05, A8 = −2.21961e−07

10th surface k = 0.000
A4 = −8.41576e−05, A6 = 2.38072e−07

11th surface k = 0.000
A4 = 1.22495e−04

21th surface k = 0.000
A4 = −4.44454e−04, A6 = 1.08826e−05, A8 = −2.50964e−07

22th surface k = 0.000
A4 = 3.48192e−04, A6 = 5.54072e−06, A8 = −1.85546e−07

Zoom data

| | WE | ST2 | TE | ST1 | ST3 |
|---|---|---|---|---|---|
| f | 3.45 | 8.28 | 19.89 | 5.34 | 12.83 |
| FNO. | 1.86 | 3.10 | 4.36 | 2.42 | 3.92 |
| 2ω | 95.19 | 42.40 | 17.94 | 64.67 | 27.59 |
| IH | 3.210 | 3.210 | 3.210 | 3.210 | 3.210 |
| FB(in air) | 5.05 | 3.97 | 2.99 | 4.45 | 3.51 |
| LTL(in air) | 56.65 | 56.65 | 56.65 | 56.65 | 56.65 |
| d8 | 22.93 | 11.36 | 2.45 | 16.89 | 6.53 |
| d14 | 1.00 | 3.28 | 12.22 | 1.78 | 6.25 |
| d16 | 1.30 | 11.67 | 12.62 | 7.16 | 13.98 |
| d22 | 3.36 | 2.28 | 1.30 | 2.76 | 1.82 |

Unit focal length

| f1 = −9.60 | f2 = 11.28 | f3 = −17.21 | f4 = 10.29 |

EXAMPLE 4

Unit mm

Surface data

| Surface no. | r | d | nd | vd |
|---|---|---|---|---|
| 1 | 18.593 | 1.00 | 1.74320 | 49.34 |
| 2 | 8.189 | 3.45 | | |
| 3* | 35.515 | 1.20 | 1.74320 | 49.34 |
| 4* | 10.000 | 1.94 | | |
| 5 | 510.370 | 0.50 | 1.66672 | 48.32 |
| 6 | 16.200 | 0.30 | | |
| 7 | 12.563 | 1.86 | 1.94595 | 17.98 |
| 8 | 26.827 | Variable | | |
| 9(Stop) | ∞ | 0.00 | | |
| 10* | 12.983 | 3.41 | 1.80610 | 40.92 |
| 11* | −24.691 | 0.74 | | |
| 12 | 100.684 | 0.50 | 1.84666 | 23.78 |
| 13 | 9.310 | 4.30 | 1.49700 | 81.54 |
| 14 | −9.557 | Variable | | |
| 15 | −66.968 | 0.50 | 1.51633 | 64.14 |
| 16 | 8.092 | Variable | | |
| 17 | 7.519 | 1.80 | 1.88100 | 40.14 |
| 18 | 13.057 | 0.91 | | |
| 19 | −1774.722 | 0.50 | 1.64769 | 33.79 |
| 20 | 7.343 | 0.87 | | |
| 21* | 12.136 | 2.95 | 1.53071 | 55.69 |
| 22* | −7.219 | Variable | | |
| 23 | ∞ | 0.50 | 1.51633 | 64.14 |
| 24 | ∞ | 0.50 | | |
| 25 | ∞ | 0.50 | 1.51633 | 64.14 |
| 26 | ∞ | 0.53 | | |
| 27(Image plane) | ∞ | | | |

Aspherical surface data

3rd surface k = 0.000
A4 = −6.55650e−04, A6 = 2.62352e−05, A8 = −3.64861e−07,
A10 = 1.82480e−09

4th surface k = 0.000
A4 = −7.56762e−04, A6 = 3.04136e−05, A8 = −3.34738e−07

10th surface k = 0.000
A4 = −9.95882e−05, A6 = −1.78724e−07

11th surface k = 0.000
A4 = 2.10710e−04

21th surface k = 0.000
A4 = −1.01030e−03, A6 = 2.40837e−05, A8 = −3.70862e−07

22th surface k = 0.000
A4 = 1.67185e−04, A6 = 4.03221e−05, A8 = −9.29003e−07

-continued

Unit mm

Zoom data

|   | WE | ST2 | TE | ST1 | ST3 |
|---|---|---|---|---|---|
| f | 3.40 | 8.16 | 19.60 | 5.27 | 12.65 |
| FNO. | 1.83 | 3.02 | 4.29 | 2.38 | 3.73 |
| 2ω | 94.69 | 43.03 | 18.25 | 65.34 | 27.97 |
| IH | 3.210 | 3.210 | 3.210 | 3.210 | 3.210 |
| FB(in air) | 4.10 | 2.93 | 2.19 | 3.35 | 2.69 |
| LTL(in air) | 56.65 | 56.66 | 56.65 | 56.66 | 56.65 |
| d8 | 23.52 | 11.80 | 2.45 | 17.55 | 6.58 |
| d14 | 1.00 | 2.16 | 7.86 | 1.32 | 4.12 |
| d16 | 1.30 | 13.03 | 17.42 | 7.70 | 16.53 |
| d22 | 2.41 | 1.24 | 0.50 | 1.66 | 1.00 |

Unit focal length

| f1 = −9.02 | f2 = 10.10 | f3 = −13.95 | f4 = 12.61 |
|---|---|---|---|

EXAMPLE 5

Unit mm

Surface data

| Surface no. | r | d | nd | vd |
|---|---|---|---|---|
| 1 | 21.828 | 1.00 | 1.74320 | 49.34 |
| 2 | 8.493 | 2.63 | | |
| 3* | 15.385 | 1.20 | 1.74320 | 49.34 |
| 4* | 9.190 | 5.72 | | |
| 5 | −14.127 | 0.50 | 1.66672 | 48.32 |
| 6 | 43.140 | 0.59 | | |
| 7 | 37.628 | 3.20 | 1.94595 | 17.98 |
| 8 | −61.446 | Variable | | |
| 9(Stop) | ∞ | 0.40 | | |
| 10* | 17.806 | 4.95 | 1.74320 | 49.34 |
| 11* | −34.544 | 3.05 | | |
| 12 | 50.595 | 0.50 | 1.84666 | 23.78 |
| 13 | 10.906 | 4.66 | 1.49700 | 81.54 |
| 14 | −13.576 | Variable | | |
| 15 | 570.648 | 0.50 | 1.49700 | 81.54 |
| 16 | 12.371 | Variable | | |
| 17 | 8.674 | 1.52 | 1.91082 | 35.25 |
| 18 | 14.437 | 0.96 | | |
| 19 | −74.625 | 0.50 | 1.71500 | 37.00 |
| 20 | 7.909 | 1.22 | | |
| 21* | 9.461 | 4.00 | 1.57500 | 55.80 |
| 22* | −7.949 | Variable | | |
| 23 | ∞ | 1.32 | 1.51633 | 64.14 |
| 24 | ∞ | 0.84 | | |
| 25 | ∞ | 0.50 | 1.51633 | 64.14 |
| 26 | ∞ | 0.19 | | |
| 27(Image plane) | ∞ | | | |

Aspherical surface data

3rd surface k = 0.000
A4 = −4.67636e−04, A6 = 1.45795e−05, A8 = −1.35681e−07,
A10 = 6.56469e−10

4th surface k = 0.000
A4 = −6.60704e−04, A6 = 1.63425e−05, A8 = −1.12613e−07

10th surface k = 0.000
A4 = −1.81243e−05, A6 = 1.11930e−07

-continued

Unit mm

11th surface k = 0.000
A4 = 1.00711e−04

21th surface k = 0.000
A4 = −4.50170e−04, A6 = 1.54361e−05, A8 = −3.77395e−07

22th surface k = 0.000
A4 = 5.14215e−04, A6 = 1.29250e−05, A8 = −4.33391e−07

Zoom data

|   | WE | ST2 | TE | ST1 | ST3 |
|---|---|---|---|---|---|
| f | 3.40 | 7.45 | 16.33 | 5.03 | 11.03 |
| FNO. | 1.90 | 3.00 | 4.27 | 2.42 | 3.62 |
| 2ω | 91.75 | 45.16 | 20.82 | 65.37 | 30.74 |
| IH | 3.084 | 3.084 | 3.084 | 3.084 | 3.084 |
| FB(in air) | 4.48 | 3.37 | 2.99 | 3.85 | 3.13 |
| LTL(in air) | 71.43 | 71.43 | 71.43 | 71.43 | 71.43 |
| d8 | 25.43 | 13.20 | 2.10 | 19.26 | 7.38 |
| d14 | 2.20 | 3.47 | 14.15 | 2.28 | 6.65 |
| d16 | 2.20 | 14.27 | 15.07 | 8.93 | 17.15 |
| d22 | 2.25 | 1.15 | 0.76 | 1.62 | 0.90 |

Unit focal length

| f1 = −8.75 | f2 = 14.36 | f3 = −25.45 | f4 = 12.68 |
|---|---|---|---|

The aberration diagrams of Examples 1 to 5 above are respectively shown in FIG. 6A to FIG. 6L, FIG. 7A to FIG. 7L, FIG. 8A to FIG. 8L, FIG. 9A to FIG. 9L, and FIG. 10A to FIG. 10L. In the figures, "ω" denotes a half angle of view.

In these aberration diagrams, FIG. 6A, FIG. 7A, FIG. 8A, FIG. 9A, and FIG. 10A show spherical aberration (SA) at the wide-angle end, FIG. 6B, FIG. 7B, FIG. 8B, FIG. 9B, and FIG. 10B show astigmatism (AS) at the wide-angle end, FIG. 6C, FIG. 7C, FIG. 8C, FIG. 9C, and FIG. 10C show distortion (DT) at the wide-angle end, and FIG. 6D, FIG. 7D, FIG. 8D, FIG. 9D, and FIG. 10D show chromatic aberration of magnification (CC) at the wide-angle end.

Furthermore, FIG. 6E, FIG. 7E, FIG. 8E, FIG. 9E, and FIG. 10E show spherical aberration (SA) in the intermediate focal length state (ST2), FIG. 6F, FIG. 7F, FIG. 8F, FIG. 9F, and FIG. 10F show astigmatism (AS) in the intermediate focal length state (ST2), FIG. 6G, FIG. 7G, FIG. 8G, FIG. 9G, and FIG. 10G show distortion (DT) in the intermediate focal length state (ST2), and FIG. 6H, FIG. 7H, FIG. 8H, FIG. 9H, and FIG. 10H show chromatic aberration of magnification (CC) in the intermediate focal length state (ST2).

Furthermore, FIG. 6I, FIG. 7I, FIG. 8I, FIG. 9I, and FIG. 10I show spherical aberration (SA) at the telephoto end, FIG. 6J, FIG. 7J, FIG. 8J, FIG. 9J, and FIG. 10J show astigmatism (AS) at the telephoto end, FIG. 6K, FIG. 7K, FIG. 8K, FIG. 9K, and FIG. 10K show distortion (DT) at the telephoto end, and FIG. 6L, FIG. 7L, FIG. 8L, FIG. 9L, and FIG. 10L show chromatic aberration of magnification (CC) at the telephoto end.

Next, the values of conditional expressions (1) to (6) in each example are shown below.

|  | Example1 | Example2 | Example3 |
|---|---|---|---|
| (1), (1a)$f_2/f_w$ | 3.715118 | 3.869251 | 3.27118 |
| (2), (2a)$\Delta_{2GWT}/f_w$ | 6.034236 | 7.787648 | 5.936799 |
| (3) $(r_{f11} + r_{R11})/(r_{f11} - r_{R11})$ | 3.487001 | 2.667634 | 1.97687 |
| (4) $(r_{f13} + r_{R13})/(r_{f13} - r_{R13})$ | −2.728983 | −2.48379 | 0.472444 |
| (5) $|(1 - (mg3t)^2) \times (mg4t)^2|$ | 1.196042 | 1.171081 | 1.74786 |
| (6) $\omega_w/f_2$ | 3.835156 | 3.673881 | 4.218165 |

|  | Example4 | Example5 |
|---|---|---|
| (1), (1a)$f_2/f_w$ | 2.972466 | 4.223528 |
| (2), (2a)$\Delta_{2GWT}/f_w$ | 6.198583 | 6.863301 |
| (3) $(r_{f11} + r_{R11})/(r_{f11} - r_{R11})$ | 2.574107 | 2.273875 |
| (4) $(r_{f13} + r_{R13})/(r_{f13} - r_{R13})$ | 1.065564 | −0.506635 |
| (5) $|(1 - (mg3t)^2) \times (mg4t)^2|$ | 3.214786 | 1.340782 |
| (6) $\omega_w/f2$ | 4.685644 | 3.195118 |

Figure 11:
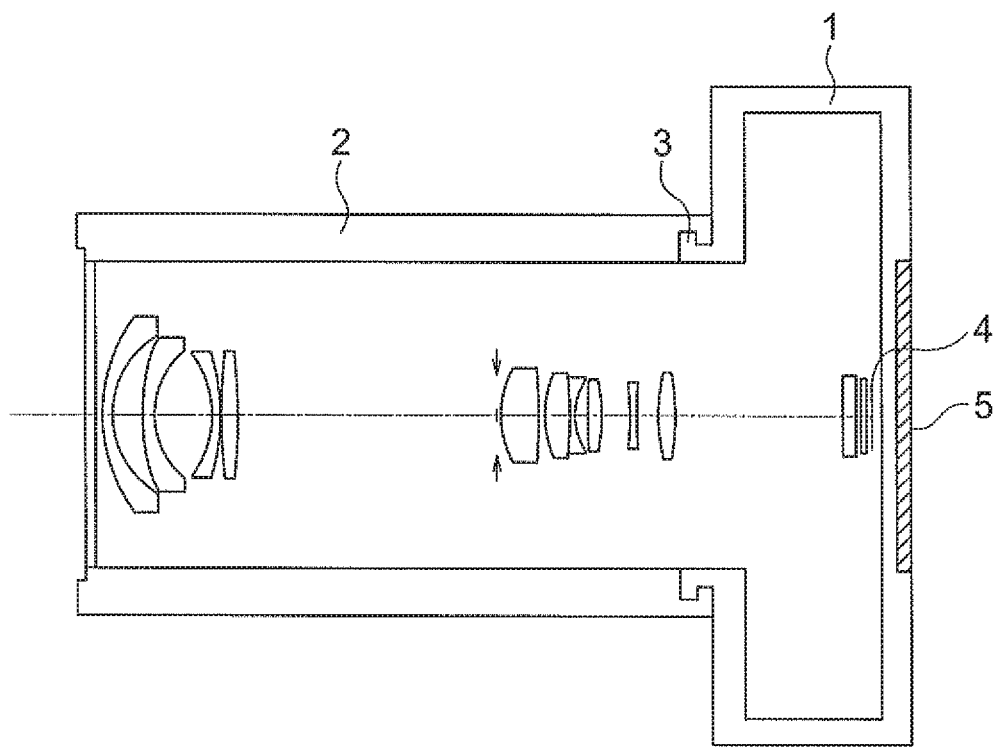
FIG. 11 is a cross-sectional diagram of an image pickup apparatus.

FIG. 11 is a cross-sectional view of a single-lens mirrorless camera as an electronic image pickup apparatus. In FIG. 11, a photographic optical system 2 is disposed inside a lens barrel of a single-lens mirrorless camera 1. A mount portion 3 enables the photographic optical system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the photographic optical system 2 of the single-lens mirrorless camera 1, the zoom lens described in any one of the examples from the first example to the fifth example is to be used.

Figure 12:
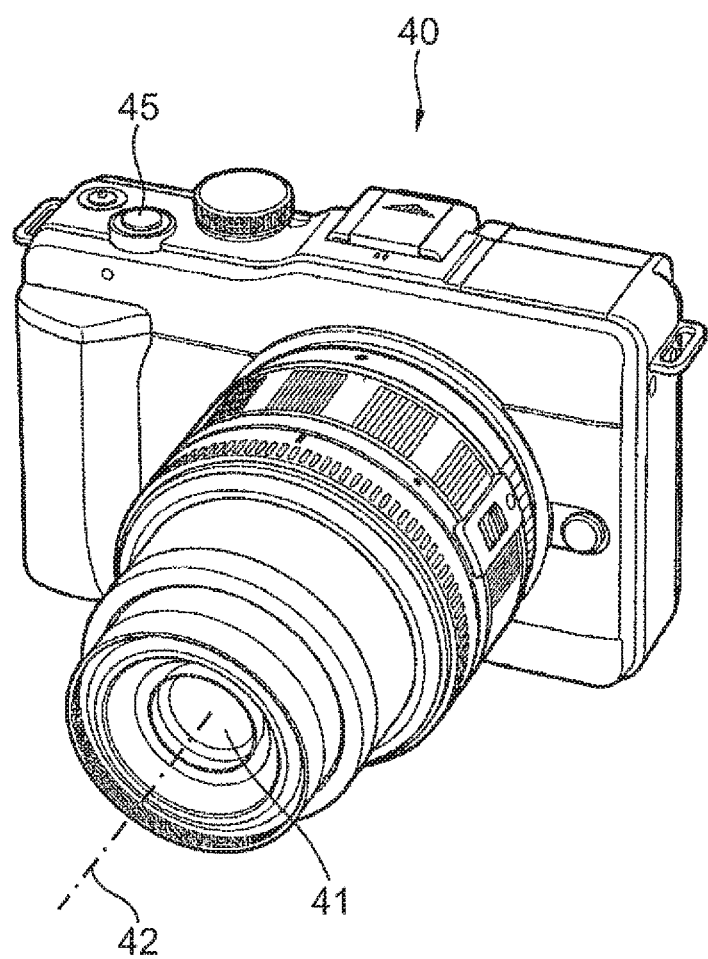
FIG. 12 is a front perspective view of the image pickup apparatus.
Figure 13:
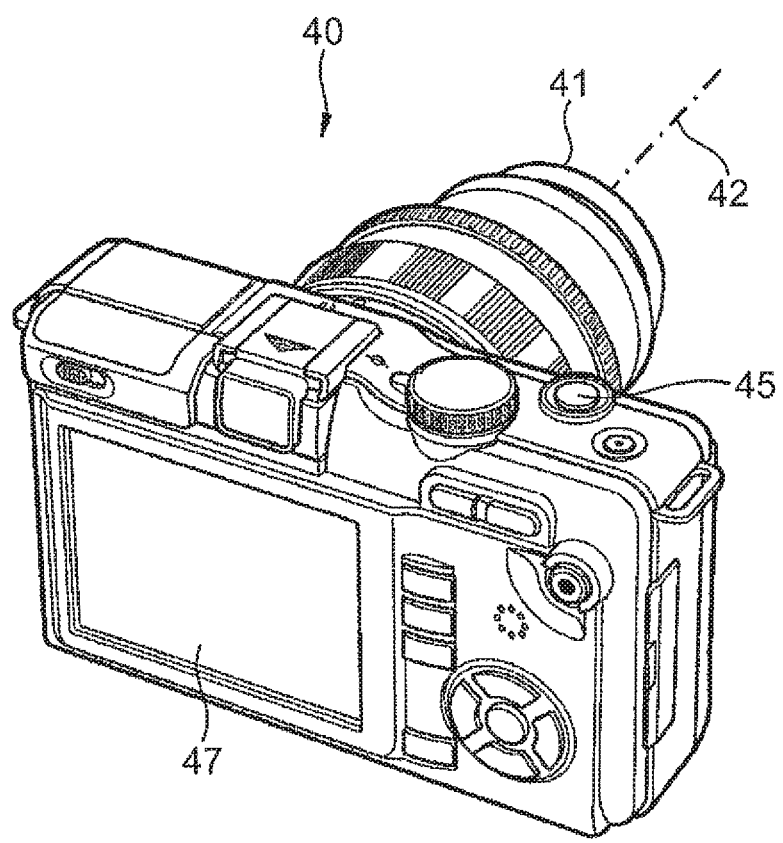
FIG. 13 is a rear perspective view of the image pickup apparatus.
Figure 14:
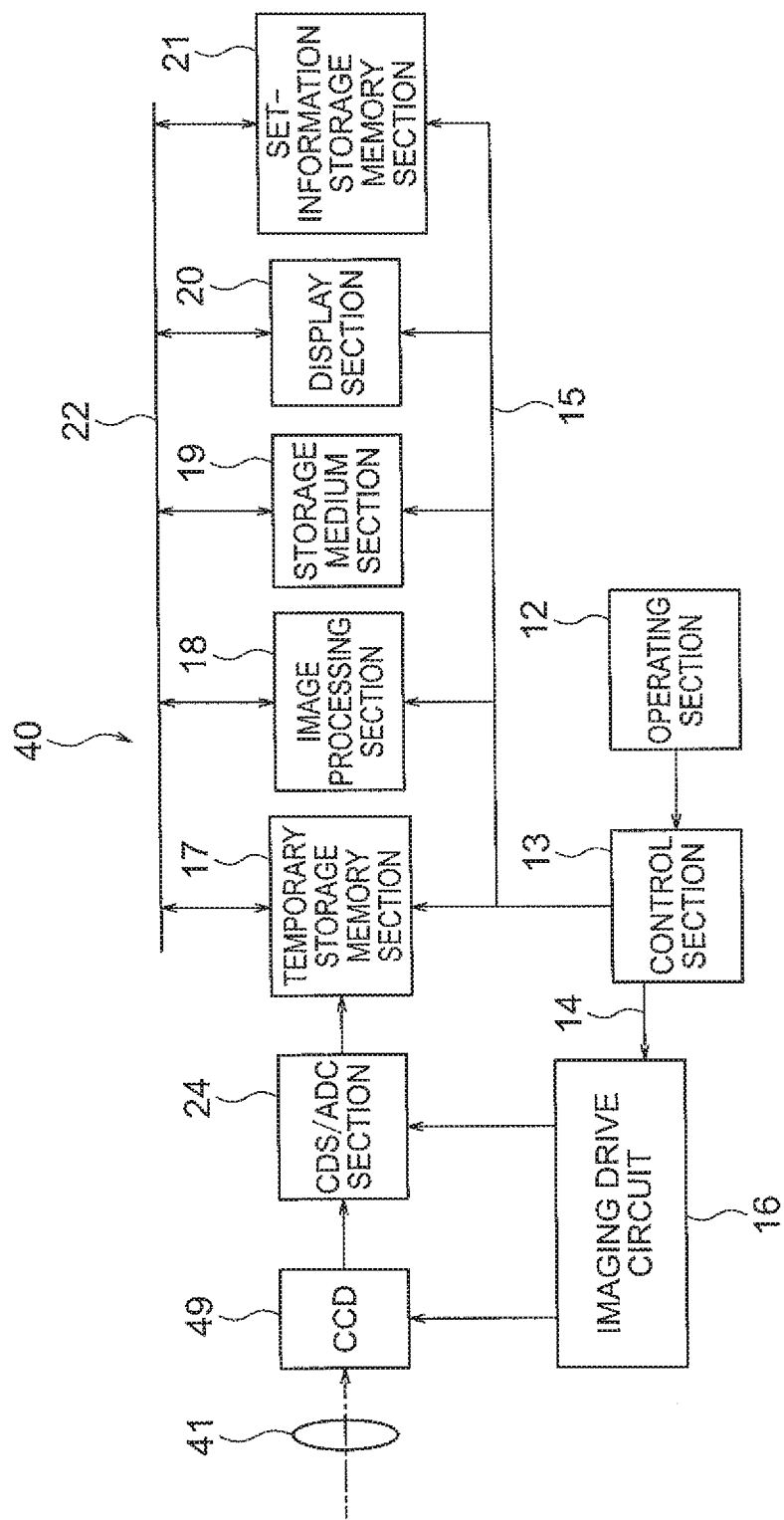
FIG. 14 is a configuration block diagram of an internal circuit of the main part of the image pickup apparatus.

FIG. 12 and FIG. 13 are conceptual diagrams of an arrangement of the image pickup apparatus. FIG. 12 is a front perspective view of a digital camera 40 as the image pickup apparatus, and FIG. 14 is a rear perspective view of the digital camera 40. The zoom lens according to the present example is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the zoom lens according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a storage means.

FIG. 14 is a structural block diagram of an internal circuit of main components of the digital camera 40. In the following description, the processing means described above includes for instance, a CDS/ADC section 24, a temporary storage memory 17, and an image processing section 18, and a storage means consists of a storage medium section 19 for example.

As shown in FIG. 14, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 an image pickup element which is driven and controlled by the imaging drive circuit 16, and which converts an amount of light for each pixel of the object image formed by the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays photographed RAW data, image data and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

By employing the zoom lens of the present example as the imaging optical system 41, it is possible to form the digital camera 40 configured as described above as an image pickup apparatus excellent in portability and capable of picking up an image in a wide range at high resolution.

According to the present invention, it is possible to provide a zoom lens that is compact yet has a wide angle and a large aperture and, moreover, has favorable optical performance in the entire zoom range, and an image pickup apparatus including the same.

As described above, the present invention is suitable for a zoom lens that is compact yet has a wide angle and a large aperture and, moreover, has favorable optical performance in the entire zoom range, and an image pickup apparatus including the same.

What is claimed is:

1. A zoom lens comprising, in order from an object side:
a first lens unit having negative refractive power;
a second lens unit having positive refractive power;
a third lens unit having negative refractive power; and
a fourth lens unit having positive refractive power,
wherein the first lens unit includes four lenses, which are
  a negative lens, a negative lens, a negative lens, and a positive lens, in order from the object side, and
wherein, at a time of zooming from a wide-angle end to a telephoto end:
  a distance between the first lens unit and the second lens unit is reduced,
  a distance between the third lens unit and the fourth lens unit is increased, and
  the fourth lens unit is fixed, and
  Conditional Expressions (1), (2), and (4) below are satisfied:

$$2.5 \leq f_2/f_w \leq 4.5 \quad (1),$$

$$4.3 \leq \Delta_{2GWT}/f_w \leq 8.0 \quad (2), \text{ and}$$

$$-5.0 < (r_{f13}+r_{R13})/(r_{f13}-r_{R13}) < -0.5 \quad (4),$$

where:
$f_2$ is a focal length of the second lens unit,
$f_w$ is a focal length of an entirety of the zoom lens, at the wide-angle end,
$\Delta_{2GWT}$ is a total amount of movement of the second lens unit at the time of zooming from the wide-angle end to the telephoto end,
$r_{f13}$ is a radius of curvature of an object-side surface of a third lens from the object side in the first lens unit, and
$r_{R13}$ is a radius of curvature of an image-side surface of the third lens from the object side in the first lens unit.

2. The zoom lens according to claim 1, wherein Conditional Expression (3) below is satisfied:

$$0.5 < (r_{f11}+r_{R11})/(r_{f11}-r_{R11}) < 5.0 \quad (3),$$

where:
$r_{f11}$ is a radius of curvature of an object-side surface of a lens closest to the object side in the first lens unit, and
$r_{R11}$ is a radius of curvature of an image-side surface of the lens closest to the object side in the first lens unit.

3. An image pickup apparatus comprising:
the zoom lens according to claim 2; and
an image pickup element that converts an image formed by the zoom lens into an electrical signal.

4. The zoom lens according to claim 1, wherein Conditional Expression (6) below is satisfied:

$$2.0 \, (°/mm) < \omega_w/f_2 \leq 5.0 \, (°/mm) \quad (6),$$

where:
$\omega_w$ is a half angle of view at the wide-angle end of the entirety of the zoom lens.

5. An image pickup apparatus comprising:
the zoom lens according to claim 1; and
an image pickup element that converts an image formed by the zoom lens into an electrical signal.

6. An image pickup apparatus comprising:
the zoom lens according to claim 4; and
an image pickup element that converts an image formed by the zoom lens into an electrical signal.

7. The zoom lens according to claim 4, wherein Conditional Expression (6)' is satisfied:

$$3.0(°/mm) < \omega_w/f_2 \leq 4.7(°/mm) \quad (6)'.$$

8. The zoom lens according to claim 4, wherein Conditional Expressions (1)', (2)', and (6)' below are satisfied:

$$2.9 \leq f_2/f_w \leq 4.25 \quad (1)',$$

$$5.0 \leq \Delta_{2GWT}/f_w \leq 8.0 \quad (2)', \text{ and}$$

$$3.0(°/mm) < \omega_w/f_2 \, 4.7(°/mm) \quad (6)'.$$

9. The zoom lens according to claim 1, wherein Conditional Expression (1)' below is satisfied:

$$2.9 \leq f_2/f_w \leq 4.25 \quad (1)'.$$

10. The zoom lens according to claim 1, wherein Conditional Expression (2)' below is satisfied:

$$5.0 \leq \Delta_{2GWT}/f_w \leq 8.0 \quad (2)'.$$

11. The zoom lens according to claim 1, wherein Conditional Expressions (1)' and (2)' below are satisfied:

$$2.9 \leq f_2/f_w \leq 4.25 \quad (1)', \text{ and}$$

$$5.0 \leq \Delta_{2GWT}/f_w \leq 8.0 \quad (2)'.$$

* * * * *